United States Patent
Corrain

(10) Patent No.: US 7,593,114 B2
(45) Date of Patent: Sep. 22, 2009

(54) DEVICE AND METHOD FOR FOCUSING A LASER LIGHT BEAM

(75) Inventor: Gabriele Corrain, San Marino di Bentivoglio (IT)

(73) Assignee: Datalogic, S.p.A., Lippo di Calderara di Reno (IT)

( * ) Notice: Subject to any disclaimer, the term of this patent is extended or adjusted under 35 U.S.C. 154(b) by 211 days.

(21) Appl. No.: 11/379,871

(22) Filed: Apr. 24, 2006

(65) Prior Publication Data
US 2007/0153644 A1     Jul. 5, 2007

(30) Foreign Application Priority Data
Dec. 30, 2005     (EP)     ................. 05425953

(51) Int. Cl.
*G01B 9/02*     (2006.01)
(52) U.S. Cl. ..................................... 356/520
(58) Field of Classification Search ......... 356/122–126, 356/44.23, 519, 450, 520, 624
See application file for complete search history.

(56) References Cited

U.S. PATENT DOCUMENTS

| 4,604,739 | A | 8/1986 | Cohen |
| 4,641,020 | A | 2/1987 | Iwai |
| 5,338,924 | A | 8/1994 | Barrett et al. |
| 5,446,710 | A | 8/1995 | Gardner et al. |
| 6,119,942 | A | 9/2000 | Pierenkemper et al. |
| 6,134,199 | A | 10/2000 | Ceshkovsky |
| 6,288,986 | B1 | 9/2001 | McDonald et al. |
| 6,621,060 | B1 | 9/2003 | Nantel et al. |
| 6,728,171 | B2 | 4/2004 | Yanagi et al. |
| 6,794,625 | B2 * | 9/2004 | Feldman ................. 250/201.2 |
| 2002/0171028 | A1 | 11/2002 | Feldman |
| 2006/0226335 | A1 | 10/2006 | Runge et al. |

FOREIGN PATENT DOCUMENTS

| DE | 102005016029 A1 | 10/2006 |
| EP | 1710608 A1 | 10/2006 |
| JP | 11214299 | 8/1999 |

OTHER PUBLICATIONS

Written Opinion for PCT/EP2006/012169 dated May 4, 2007.
European Search Report for EP Patent Application 05425953.6 dated Jul. 10, 2006.

* cited by examiner

*Primary Examiner*—Tarifur Chowdhury
*Assistant Examiner*—Michael Lapage
(74) *Attorney, Agent, or Firm*—Duane Morris LLP

(57) ABSTRACT

A device for focusing a laser light beam includes an emission source of a laser light beam along an optical emission path, first focusing means of the laser light beam in a focusing point (F) located at a focusing distance (D), means for adjusting the position of the focusing point (F) relative to the device, and means for detecting the focusing distance (D) active in feedback on the adjustment means, wherein the detection means detects a parameter characteristic of the light beam leaving the first focusing means and representative of the focusing distance (D). The characteristic parameter is the wavefront radius of curvature of the light beam leaving the first focusing means.

32 Claims, 14 Drawing Sheets

DEVICE AND METHOD FOR FOCUSING A LASER LIGHT BEAM

FIELD OF THE INVENTION

The present invention relates to a device and a method for focusing a laser light beam, and more particularly to a device and a method for controlling and automatically adjusting the focusing distance of a laser light beam. The invention also relates to a coded information reader comprising such a focusing device.

BACKGROUND OF THE INVENTION

Typically, a device for focusing a laser light beam comprises an emission source of the laser light beam along an optical emission path and an optical focusing system, typically comprising at least one focusing lens or mirror, adapted to focus the laser light beam at a predetermined focusing distance.

As known, the maximum resolution of an optical code reader, that is, the minimum dimension of the details that can be detected thereby, depends on the beam diameter at the distance at which such beam is focused.

For a wide range of applications, the distance at which the optical code is located, and therefore the distance at which the light beam has to be focused, is not predetermined. It is therefore necessary to use devices capable of automatically adjusting the focusing distance. Such devices allow extending the area within which the maximum resolution can be attained. Such devices are also known as auto-focus devices.

In conventional auto-focus devices, the automatic adjustment of the wanted focusing distance is achieved through the relative mechanical movement of the light source and of the optical focusing system or, in the case of focal variation optical devices, of a portion of the optical focusing system.

Devices are known wherein such mechanical movement is actuated on the basis of a signal detected through special detection means and representative of the distance at which the support containing the information to be read is located.

For example, U.S. Pat. Nos. 4,604,739 and 5,446,710 disclose auto-focus devices for readers of information contained on a reflecting support, wherein the wanted focusing distance is adjusted on the basis of a signal indicative of the distance of the reflecting support. Such distance is calculated by intercepting and detecting, through a lateral interferometer, the light beam reflected by the reflecting support.

U.S. Pat. No. 4,641,020 discloses an auto-focus device for a reader of information contained on a reflecting support, wherein the wanted focusing distance is adjusted on the basis of a signal representative of the position of the focusing lens relative to the emitting source.

U.S. Pat. No. 6,134,199 discloses an auto-focus device for a reader of information contained on a reflecting support, wherein the wanted focusing distance is adjusted on the basis of a signal representative of the distance of the reflecting support. Such distance is calculated by detecting the light beam reflected by the support and re-collimated through the same focusing lens arranged in the optical emission path.

U.S. Pat. No. 6,621,060 B1 discloses an auto-focus device for mechanical laser processing, wherein the focus correction is actuated through the observation of the spot produced by an accessory laser light beam on the surface of the piece to be processed through the focusing lens of the laser light beam used for the mechanical processing.

U.S. Pat. No. 6,728,171 B2 discloses an auto-focus device for imaging apparatus, wherein the focus correction is actuated through an accessory light beam focused on the surface of the focusing lens and observed by a sensor always through the same lens.

In some of the auto-focus devices described in the patents mentioned above, the focus position is adjusted through the measurement of the reciprocal position between the surface on which the focus has to be maintained and the focus itself.

The Applicant has found that some of such devices have the disadvantage of being usable only if the information is contained on a reflecting support, a case that happens in a limited class of applications.

In other currently known devices, the focus position is adjusted indirectly through the measurement of the reciprocal position of the optical focusing system relative to the emitting source, or in the case of focal variation optical devices, of the reciprocal position of some elements of the optical focusing system relative to the entire optical system.

The Applicant has found that such devices have the disadvantage of being very sensitive to possible errors in the relative positioning between optical focusing system and light source or, in the case of focal variation optical devices, between elements of the optical focusing system. In particular, the Applicant has found that in such devices, possible positioning errors or unwanted movements of the mechanical and optical parts of the optical focusing system, resulting for example from thermal expansion, mechanical clearance or vibrations, cause an error in the adjustment of the expected and/or wanted focusing distance. In other words, the Applicant has verified that the above errors (or unwanted movements) cause the positioning of the focusing point at a focusing distance other than that expected and/or wanted.

In fact, by simplifying the description of the optical systems through the paraxial approximation, position q of the focusing point is given by:

$$\frac{1}{q} = \frac{1}{f} - \frac{1}{p}$$

wherein f is the focal length of the optical system used for focusing and p is the position of the light source relative to the optical system.

Therefore the absolute error $\Delta q$ associated with the focusing point is:

$$\Delta q = \left| \frac{f^2}{(p-f)^2} \right| \Delta p + \left| \frac{p^2}{(p-f)^2} \right| \Delta f$$

with $\Delta p$ absolute error on the positioning of the optical system and $\Delta f$ absolute error on the focal length of the optical system; in particular, $\Delta f$ is other than zero in the optical systems based on the actuation through focal variation.

From the above equation it is clear that errors $\Delta p$ and $\Delta f$ cause an error of the focusing point $\Delta q$.

Often, errors $\Delta p$ and $\Delta f$ are not systematic, as they depend on factors such as temperature, mechanical clearance, non-repeatability of the construction parameters of the optical, electronic or mechanical components. An indetermination of the actual position of the focusing point therefore occurs; in current focusing devices, such indetermination forces to the use of light beams of a larger diameter, with consequent reduction of the maximum resolution.

The Applicant has further found that in the focusing devices discussed above, the operations for assembling and calibrating the mechanical and optical components are quite difficult, as it is necessary to ensure strict tightening tolerances between fixed components and moving components. This implies the use of particularly sophisticated construction solutions, with obvious consequences both on the final cost of the device and on the dimensions of the same. Similar problems arise with reference to the device used for the mechanical moving of the focusing systems: as such device has to ensure movements in the range of a millimeter or of a tenth of millimeter, it must be highly accurate.

U.S. Pat. No. 6,119,942 discloses an auto-focus device used in an optical code reader through the scanning of a laser light beam, wherein the focus correction is determined by the measurement of the diameter of the laser light beam at a predetermined distance, this measurement being obtained by scanning the laser light beam on a photosensitive element and subsequently measuring the scanning duration.

The Applicant has found that in such device, the direct adjustment of the focusing distance by measuring the beam diameter through the scanning on a photosensitive element is subject to considerable inaccuracy, since the variation of the beam diameter is weakly related to the focusing distance. In particular, such variation tends to zero as the focusing distance approaches the emission point, where greater focusing accuracy is typically required. In fact, at distances closer to the reader, the capability of reading higher resolution codes is typically required and therefore, a high focusing accuracy becomes important. The Applicant has further found that in such device the adjustment of the focusing distance cannot be carried out in real time and continuously during the scanning due to the fact that the diameter detecting system is arranged downstream of the scanning system and in a marginal position of the scanning field. The measurement of the diameter, and therefore the adjustment of the focusing distance, can be carried out only once for each scanning. Such adjustment system, therefore, is not capable of adapting the focusing distance in an accurate and reliable manner in situations wherein the support containing the code is curved or in other situations wherein a continuous and precise adjustment of the focusing may be necessary.

The Applicant, therefore, has considered the problem of providing an auto-focus device which should be small sized, not expensive, fast, with a high resolution and accuracy, and which should be insensitive to any positioning errors or unwanted movements between the mechanical and optical parts of the optical focusing system and/or to errors on the determination of the focal length of the optical focusing system, so as to obtain an accurate and reliable and, if needed, continuous and real time automatic adjustment of the focusing distance.

SUMMARY OF THE INVENTION

A device for focusing a laser light beam is provided including an emission source of a laser light beam along an optical emission path, first focusing means of the laser light beam in a focusing point (F) located at a focusing distance (D), means for adjusting the position of the focusing point (F) relative to the device, and means for detecting the focusing distance (D) active in feedback on the adjustment means, wherein the detection means detects a parameter characteristic of the light beam leaving the first focusing means and representative of the focusing distance (D). The characteristic parameter is the wavefront radius of curvature of the light beam leaving the first focusing means.

A method for focusing a laser light beam is also provided including the steps of: emitting a laser light beam along an optical emission path; focusing the light beam in a focusing point (F) located at a focusing distance (D); detecting the focusing distance (D); and adjusting the position of the focusing point (F) based on the detected focusing distance (D), wherein the step of detecting the focusing distance (D) comprises the step of detecting a parameter characteristic of the focused light beam and representative of the focusing distance (D), the characteristic parameter being the wavefront radius of curvature of the focused light beam.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Figure 1:
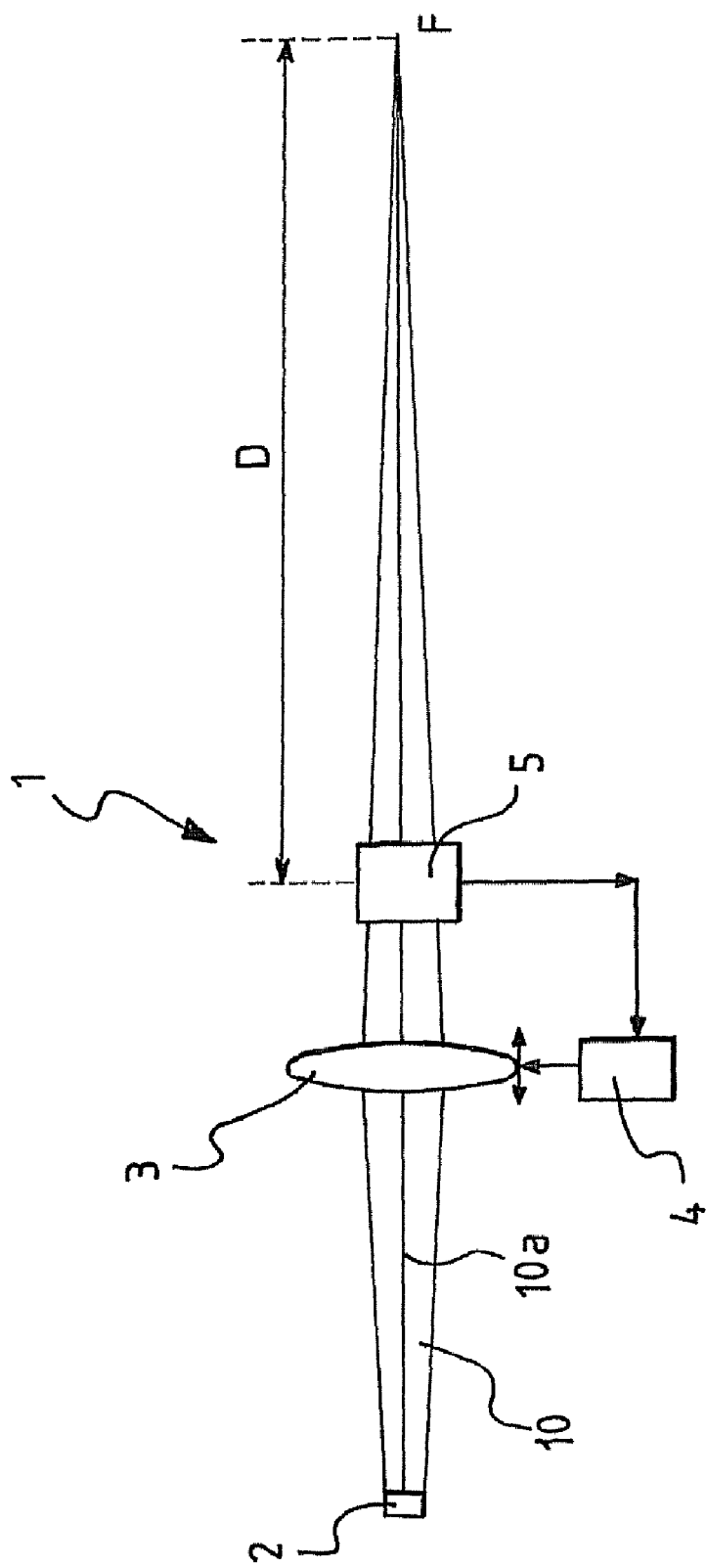
FIG. 1 is a schematic view of a focusing device according to the present invention.

Throughout the following description and appended claims, the term: "coded information reader" is used to indicate any device capable of acquiring information relating to an object (such as distance, volume, overall dimensions, or identification data thereof) through the acquisition and processing of a light signal diffused by the object itself. The term: "coded information" is used to indicate the whole identification data contained in an optical code. The term: "optical code" is used to indicate any graphical representation having the function of storing coded information. A particular example of optical code consists of the linear or two-dimensional codes, wherein the information is coded through suitable combinations of elements with a predetermined shape, for example square, rectangular or hexagonal, of dark color (normally black) separated by clear elements (spaces, normally white), such as barcodes, stacked codes and bidimensional codes in general, color codes, etc. The term "optical code" further comprises, more in general, also other graphical patterns having a function of information coding, including clear printed characters (letters, numbers, etc.) and special shaped (patterns, such as stamps, logos, signatures, fingerprints, etc.). The term "optical code" also comprises graphical representations detectable not only in the field of visible light but also in the range of wavelengths comprised between infrared and ultraviolet.

For exemplificative purpose and in order to make the following description clearer, explicit reference shall be made below to a barcode reader (linear reader); of course, a person skilled in the art will understand that what said is also applicable to different readers, such as bidimensional optical code readers (matrix or area readers).

The person skilled in the art will further understand that the focusing device of the present invention can be applied to equipment other than the coded information readers. For example, the device of the present invention can be applied to laser cutting/marking/welding equipment, and in general to any equipment where the control and/or the adjustment of the focusing distance of a laser light beam is required or wanted for achieving optimum focusing conditions at different distances.

The present invention therefore relates, in a first aspect thereof, to a device for focusing a laser light beam, comprising:

an emission source of a laser light beam along an optical emission path;
first focusing means of the laser light beam in a focusing point located at a focusing distance;
means for adjusting the position of the focusing point relative to the device;
means for detecting the focusing distance active in feedback on the adjustment means, wherein the detection means detects a parameter characteristic of the light beam leaving the first focusing means and representative of the focusing distance;
wherein the characteristic parameter is the wavefront radius of curvature of the light beam leaving the first focusing means.

Advantageously, in the device of the present invention, the automatic adjustment of the focusing distance to the wanted value is solely based on the direct detection of a parameter representative of the actual focusing distance, in particular through the direct detection of the wavefront radius of curvature of the beam leaving the first focusing means. Such direct detection acts in feedback on the means for adjusting the position of the focusing point so as to change the position thereof. The detection of the new actuated focusing distance and the feedback on the means for adjusting the position of the focusing point continues until the wanted focusing distance is achieved. Therefore, possible positioning errors and/ or unwanted movements of the mechanical and optical parts that could cause an actual focusing distance differing from that expected, are suitably detected, thus allowing an accurate and reliable adjustment of the wanted focusing distance.

From the manufacturing point of view, this advantageously gives the possibility of using simple, inexpensive and compact solutions, while increasing the maximum achievable resolution. For example, the focusing means may also be composed of a single aspheric lens, optionally of a plastic material. The position of such lens may be adjusted through a simple voice-coil. Alternatively, the adjustment means may be made with piezoelectric actuators, or bimorph piezoelectric benders, with a lens arranged on the free end thereof. The focusing means may also be made using a variable focal lens, such as a liquid lens or a deformable surface mirror.

Advantageously, in accordance with the present invention, the detection of the actual focusing distance is solely based on an analysis of the optical properties of the focused beam and, in particular, on the wavefront radius of curvature analysis of the beam leaving the focusing means. In fact, in the region far from the focusing point, the wavefront of the focused beam consists of a spherical cap having radius of curvature equal to the focusing distance, where by wavefront it is meant the geometrical place in the space of those points wherein the electromagnetic field of the radiation of the beam exhibits the same phase. Advantageously, the detection of the wavefront radius of curvature of the light beam leaving the focusing means thus allows a direct measurement of the actual focusing distance to be obtained.

In a preferred embodiment of the device of the present invention, the above detection means calculate a value of the focusing distance.

Preferably, the detection means comprises:

a glass sheet of predetermined thickness and refractive index, arranged in the optical emission path downstream of the first focusing means and adapted to generate a reflected light beam that propagates along an optical reflection path inclined relative to the optical emission path, the reflected light beam being defined by a pair of light beams partly overlapped and defining an interference region;
photodetector means arranged in the optical reflection path and adapted to generate a signal representative of a parameter characteristic of the interference region;
means for processing the signal so as to generate a signal indicative of the radius of curvature.

The detection of the radius of curvature is therefore obtained by using any conventional interferometer, that is, any instrument capable of producing interference between two light beams generated starting from a single light beam, and conventional photodetector and processor means. Advantageously, the photodetector and processor means provide an electrical signal representative of the interference region and indicative of the wavefront radius of curvature of the focused light beam and therefore a measurement of the actual focusing distance.

Preferably, the glass sheet is arranged at 45° relative to the optical emission path, since this is the angle at which there are smaller mechanical overall dimensions of the means for detecting the signal representative of the focusing distance and a good overlapping of the reflected light beams. In fact, the arrangement of the sheet with an angle smaller than 45° would imply larger mechanical overall dimensions, while the arrangement of the sheet with an angle larger than 45° would imply a smaller overlapping of the reflected light beams.

Preferably, the parameter characteristic of the interference region is the spatial frequency of a plurality of interference fringes defined by the interference region on an observation plane located in the optical reflection path. In fact, it is known that the interference pattern produced on an observation plane perpendicular to the direction of propagation of the reflected light beams consists of a plurality of parallel fringes and has a sinusoidal intensity profile, with frequency depending on the radius of curvature of the wavefronts incident on the observation plane. Such radius of curvature is correlated to the wavefront radius of curvature of the focused beam and therefore, to the actual focusing distance.

In a preferred embodiment of the device of the present invention, the photodetector means comprises an array of photosensitive elements arranged on the observation plane along a direction of succession of the fringes. For example, the photodetector means comprises a CCD sensor. Advantageously, the determination of the frequency of the fringe system is obtained in this case by sequentially measuring, along the direction of succession of the fringes, the signal coming from each photosensitive element. The measurement of the frequency of the temporal series of measurements is directly related to the spatial frequency of the plurality of fringes through the scanning speed of the array of photosensitive elements, as it will clearly appear from the continuation of the present description. Once the scanning speed of the array of photosensitive elements is known and the above temporal frequency is detected, it is therefore possible to calculate the spatial frequency of the plurality of fringes and thereby, the wavefront radius of curvature of the focused beam.

In alternative embodiments, the observation plane comprises at least one slit adapted to allow the passage of at least one portion of the interference region and the photodetector means comprises at least one photosensitive element arranged in the optical reflection path downstream of the at least one slit.

In this case, preferably, the at least one slit is rectangular, with the shorter side oriented along the direction of succession of the fringes. Even more preferably, the at least one slit has a dimension, along the direction of succession of the fringes, such that, for a predetermined range of frequencies of the fringes, the integral function of the light intensity of the reflected light beam at the at least one portion of interference region is monotonic.

In particular, in a first alternative embodiment of the device of the present invention, the above observation plane comprises a single slit and the photodetector means comprises a single photosensitive element. In this case, preferably, the single slit has a pair of longer sides parallel to a first symmetry axis of the interference region perpendicular to the direction of succession of the fringes and extends on opposite sides of the observation plane relative to a second symmetry axis of the interference region parallel to the direction of succession of the fringes. More preferably, a longer side of the pair of longer sides is overlapped to the first symmetry axis. Specifically, in such embodiment the slit is preferably placed on the first and fourth quadrant of the reference system defined on the observation plane by the above first and second symmetry axes of the interference region and has a longer side overlapped to the first symmetry axis. Alternatively, the slit may be placed on the second and third quadrant.

In a second optional embodiment of the device of the present invention, the observation plane comprises two slits and the photodetector means comprises two photosensitive elements, one for each of the two slits. In this case, preferably, the two slits are respectively formed on opposite sides of the observation plane relative to a first symmetry axis of the interference region perpendicular to the direction of succession of the fringes and, more preferably, have a longer side coinciding with the first symmetry axis and are formed on opposite sides relative to a second symmetry axis of the interference region parallel to the direction of succession of the fringes. Specifically, in such embodiment one slit is preferably placed on the second (or the first) quadrant of the reference system defined on the observation plane by the above first and second symmetry axes of the interference region, and the other slit is placed on the fourth (or the third) quadrant.

Alternatively, the two slits are placed symmetrically relative to the first symmetry axis and are spaced relative to the first symmetry axis by a predetermined distance. Specifically, in such embodiment one slit is placed on the first and fourth quadrant of the reference system defined on the observation plane by the above first and second symmetry axes of the interference region, and the other slit is placed on the second and third quadrant.

In a further embodiment of the device of the present invention, irrespective of the type and number of photosensitive elements used, along the optical reflection path, between the sheet and the observation plane is provided a rotating polygonal mirror and optionally at least one deflecting mirror between the sheet and the rotating polygonal mirror. Advantageously the spatial frequency of the fringe system, in this case, is directly correlated to the modulation frequency of the light intensity of the interference region through the at least one slit by the linear speed at which the reflected light beam is made to move on the slit (such linear speed being in turn correlated to the speed of rotation of the polygonal rotor), as it will clearly appear from the continuation of the present description.

The rotating polygonal mirror can advantageously be the same polygonal mirror that acts on the refracted beam for sweeping such beam on the optical code to be read.

In the preferred embodiment of the device of the present invention, the glass sheet comprises opposite plane-parallel faces of reflecting material.

In a different embodiment thereof, the glass sheet comprises opposite plane faces of reflecting material forming such an angle $\theta$ with each other as to allow overlapping the light beams. In this case, the fringe system will be oriented according to an angle $\alpha$ relative to the direction of succession of the fringes in the case of sheet with plane-parallel faces. Advantageously, the detection of such angle $\alpha$ is directly linked to the wavefront radius of curvature of the beam leaving the focusing means, as it will clearly appear from the continuation of the present description.

In a further preferred embodiment of the device of the present invention, the detection means comprises:
- a mirror-like surface arranged downstream of the first focusing means and inclined relative to the optical emission path so as to return backwards, in a position differing from that of the emission source, a marginal portion of the focused beam;
- detector means sensitive to the incidence position of the laser light beam returned backwards for generating a signal representative of the incidence position, the detector means being integrally associated with the emission source;
- means for processing the signal for generating a signal indicative of the focusing distance.

Advantageously, in this case, the focusing distance can be detected by detecting the variation of the position wherein the beam transmitted backwards impinges the position sensor, as it will clearly appear from the continuation of the present description.

In a second aspect thereof, the present invention relates to a device for focusing a laser light beam, comprising:
- an emission source of a laser light beam along an optical emission path;
- first focusing means of the laser light beam in a focusing point located at a focusing distance;

means for adjusting the position of the focusing point relative to the device;

means for detecting the focusing distance active in feedback on the adjustment means, wherein the detection means comprises:

a sheet of predetermined thickness and refractive index, the sheet being arranged downstream of the first focusing means along the optical emission path and adapted to generate a reflected light beam that propagates along an optical reflection path inclined relative to the optical emission path;

second focusing means arranged in the optical reflection path for focusing the reflected light beam at a predetermined distance;

a diaphragm arranged in the optical reflection path downstream of the second focusing means and having an aperture concentric to the reflected light beam so as to let only a central portion of the reflected light beam pass therethrough, wherein the aperture has a diameter equal to the diameter of the reflected light beam, at the diaphragm, when the first focusing means focus the light beam emitted by the emission source at a maximum or minimum focusing distance;

photodetector means arranged in the optical reflection path downstream of the diaphragm and adapted to generate a signal representative of the variation of light intensity of the central portion of the reflected light beam as the focusing distance increases or decreases;

means for processing the signal for generating a signal indicative of the focusing distance.

Advantageously, in the focusing device described above, the focusing distance can be detected by detecting the variation of the light intensity of the light beam that passes through the circular aperture of the diaphragm as the focusing distance increases or decreases, as it will clearly appear from the continuation of the present description.

Preferably, the above processing means calculates a value of the focusing distance.

Preferably, the sheet comprises opposite plane-parallel faces, and even more preferably, one of the opposite faces is treated with an antireflective coating.

In a third aspect thereof, the present invention relates to a method for focusing a laser light beam, comprising the steps of:

emitting a laser light beam along an optical emission path;
focusing the light beam in a focusing point located at a focusing distance;
detecting the focusing distance;
adjusting the position of the focusing point based on the detected focusing distance;

wherein the step of detecting the focusing distance comprises the step of detecting a parameter characteristic of the focused light beam and representative of the focusing distance, the characteristic parameter being the wavefront radius of curvature of the focused light beam.

Advantageously, such method can be carried out with a focusing device of the type described above and therefore it has all the advantageous features mentioned above with reference to such device.

Preferably, the steps of detecting the focusing distance and adjusting the position of the focusing point based on the detected focusing distance are repeated iteratively until a wanted focusing distance is reached.

In a preferred embodiment of the method of the present invention, the step of detecting the focusing distance comprises the step of calculating a value of the focusing distance.

Preferably, the step of detecting the focusing distance comprises the steps of:

generating a reflected light beam that propagates along an optical reflection path inclined relative to the optical emission path, the reflected light beam comprising a pair of light beams partly overlapped and defining an interference region;

detecting the reflected light beam for generating a signal representative of a parameter characteristic of the interference region;

processing the signal for generating a signal indicative of the radius of curvature.

Preferably, the above processing step comprises the step of determining the spatial frequency of a plurality of interference fringes defined by the interference region on an observation plane located in the optical reflection path.

Preferably, the above step of determining the spatial frequency comprises the steps of:

selecting at least one portion of the interference region for generating a signal representative of the light intensity of the at least one portion of the interference region;

calculating the integral of the light intensity of the reflected light beam at the at least one portion of interference region.

Preferably, the at least one portion of the interference region is a rectangular portion, with a shorter side oriented along a direction of succession of the fringes. More preferably, the at least one portion of the interference region has a dimension, along the direction of succession of the fringes, such that, for a predetermined range of frequency of the fringes, the integral function of the light intensity of the reflected light beam at the at least one portion of interference region is monotonic.

In an optional embodiment of the method of the present invention, the step of detecting the focusing distance comprises the steps of:

returning backwards, along an optical path inclined relative to the optical emission path, a marginal portion of the focused light beam;

detecting, through detection means, the marginal portion of the laser light beam returned backwards for generating a signal representative of the position wherein the marginal portion returned backwards impinges the detection means;

processing the signal for generating a signal indicative of the focusing distance.

In a fourth aspect thereof, the present invention relates to a method for focusing a laser light beam, comprising the steps of:

emitting a laser light beam along an optical emission path;
focusing the light beam in a focusing point located at a focusing distance;
detecting the focusing distance;
adjusting the position of the focusing point based on the detected focusing distance;

wherein the step of detecting the focusing distance comprises the steps of:

generating a reflected light beam that propagates along an optical reflection path inclined relative to the optical emission path;

focusing the reflected light beam at a predetermined distance;

selecting a central portion of the reflected light beam through a diaphragm having a circular aperture concentric to the reflected light beam and with a diameter equal to the diameter of the reflected light beam, at the diaphragm, when the emitted light beam is focused at a maximum or minimum focusing distance;

detecting the central portion of the reflected light beam for generating a signal representative of the variation of the light intensity of the central portion of the reflected light beam as the focusing distance decreases or increases;

processing the signal for generating a signal indicative of the focusing distance.

In a preferred embodiment of the method of the present invention, the step of detecting the focusing distance comprises the step of calculating a value of the focusing distance.

In a fifth aspect thereof, the invention relates to a coded information reader comprising a focusing device of the type described above. Such a reader has all the advantageous features described above with reference to the focusing device of the present invention.

These and other features of the device and of the method of the present invention will appear more clearly from the following detailed description of some preferred embodiments thereof, made with reference to the FIGS. 1-15.

In FIG. 1, reference numeral 1 indicates a device for focusing a laser light beam according to the present invention. In particular, the device 1 is an auto-focus device, that is, a device capable of controlling and automatically adjusting the wanted focusing distance of a laser light beam.

Preferably, the device 1 is intended for being used in a coded information reader and more preferably, in a barcode reader.

The device 1 comprises a source 2 for emitting a laser light beam 10 along an optical emission path 10a and means 3 for focusing the laser light beam in a focusing point F located at a predetermined focusing distance D relative to the means 5 for detecting the focusing distance suitably provided in device 1 and described hereinafter.

The source 2 for emitting the laser light beam is of the conventional type and therefore it is not described in detail herein.

Also the focusing means 3 are of the conventional type and therefore they are not described in detail herein. In accordance with the present invention, however, such focusing means may be of a simpler and less expensive type than those typically used in conventional auto-focus devices: for example, the focusing means 3 may be composed of a single aspheric lens, optionally of a plastic material. The focusing means 3 may also be made using a variable focal lens, such as a liquid lens or a deformable surface mirror.

The focusing means 3 or, in the case of focal variation optical devices, some of the components thereof, are operatively associated with moving means 4. Such moving means is adapted to control the movement of the focusing means 3 relative to the emission source 2 (or, in the case of focal variation optical devices, of some of the components thereof) for adjusting the focusing distance D of the focusing point F.

Also the moving means 4 are of the conventional type and therefore they are not described in detail herein. In accordance with the present invention, however, the moving means 4 may be of a simpler and less expensive type than those typically used in conventional auto-focus devices, since in the device of the present invention, the accuracy of movements is not highly critical as in the devices of the prior art.

For example, the moving means 4 may consist of a simple voice-coil or of a piezoelectric actuator. Alternatively, the moving means 4 may be made with bimorph piezoelectric benders, with a lens arranged on the free end thereof.

The focusing device 1 of the present invention further comprises means for the direct detection of the focusing distance D, indicated with reference numeral 5. Such means 5 detects the focusing distance generating a signal representative of the detected distance and, optionally, calculating a value of such distance.

As illustrated in FIG. 1, the detection means 5 acts in feedback on the moving means 4 for adjusting the position of the focusing means 3 relative to the light source 2 so as to change the focusing distance D of the focusing point F from an actual measured value to a different value.

Preferably, the detection of the actual focusing distance D and the following adjustment of the position of the focusing means 3, this adjustment being controlled by the moving means 4, is carried out iteratively until a wanted focusing distance is detected.

In accordance with the present invention, the detection means 5 detects a parameter characteristic of the light beam leaving the focusing means 3 and representative of the focusing distance D at which the focusing means 3 focuses the light beam 10. Such detection is carried out using suitable detection means arranged in the optical emission path 10a and adapted to generate a signal representative of the detected parameter characteristic of the light beam leaving the focusing means 3 and means for processing the signal for generating a signal indicative of the actual focusing distance D and optionally, for calculating the numerical value thereof. The detection and processing means shall be described in detail in the continuation of the present description.

In accordance with the present invention, the characteristic parameter detected by the detection means 5 is the wavefront radius of curvature of the light beam 10 leaving the focusing means 3. In fact, in the region far from the focusing point F, that is, in the region immediately downstream of the focusing means 3, the wavefront of the focused light beam 10 consists of a spherical cap having a radius of curvature R equal to the focusing distance D.

Thus, the detection of the wavefront radius of curvature R of the light beam 10 at the region immediately downstream of the focusing means provides a direct measurement of the actual focusing distance D.

Figure 2:
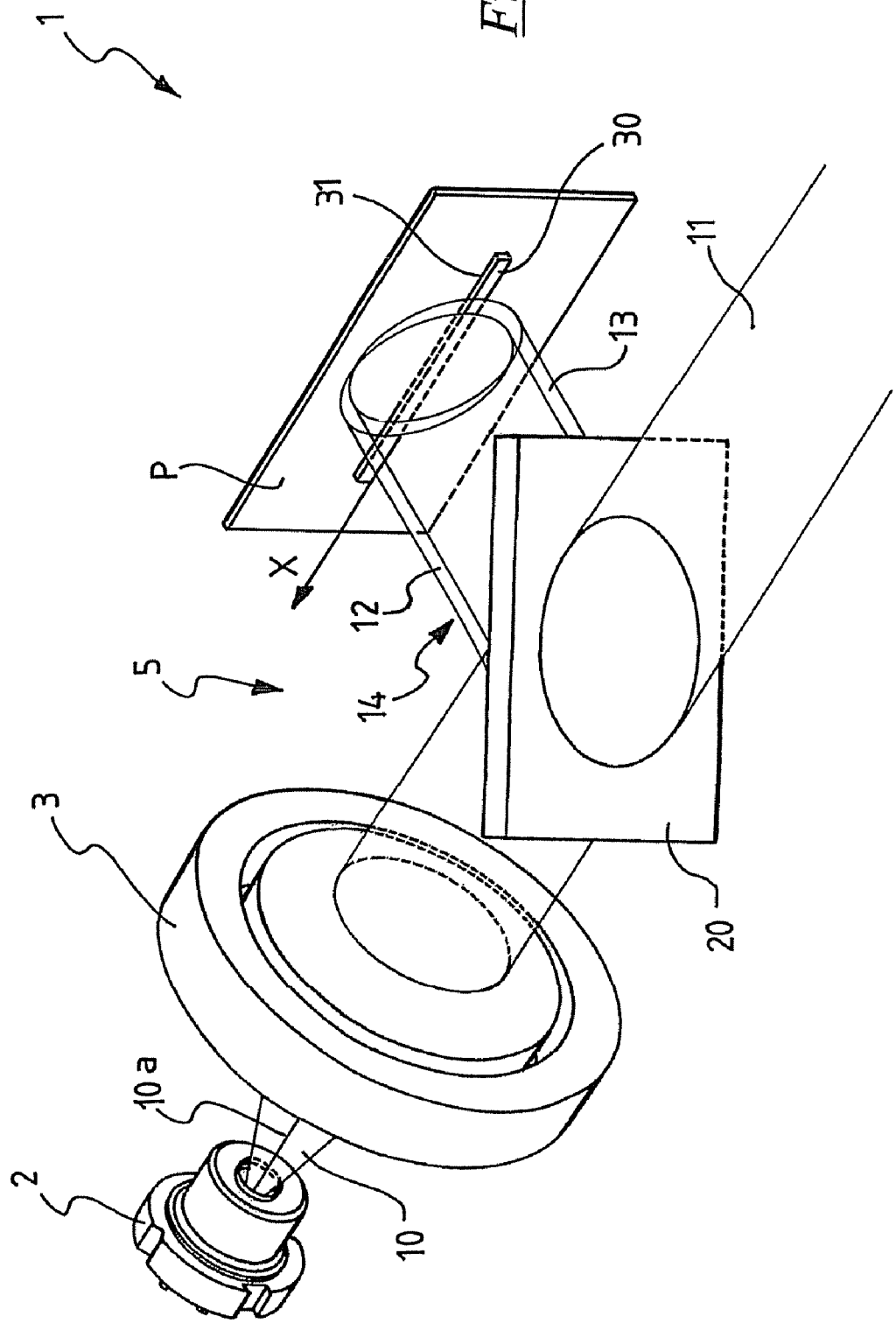
FIG. 2 is a schematic view representing part of a first embodiment of the device of the present invention.
Figure 3:
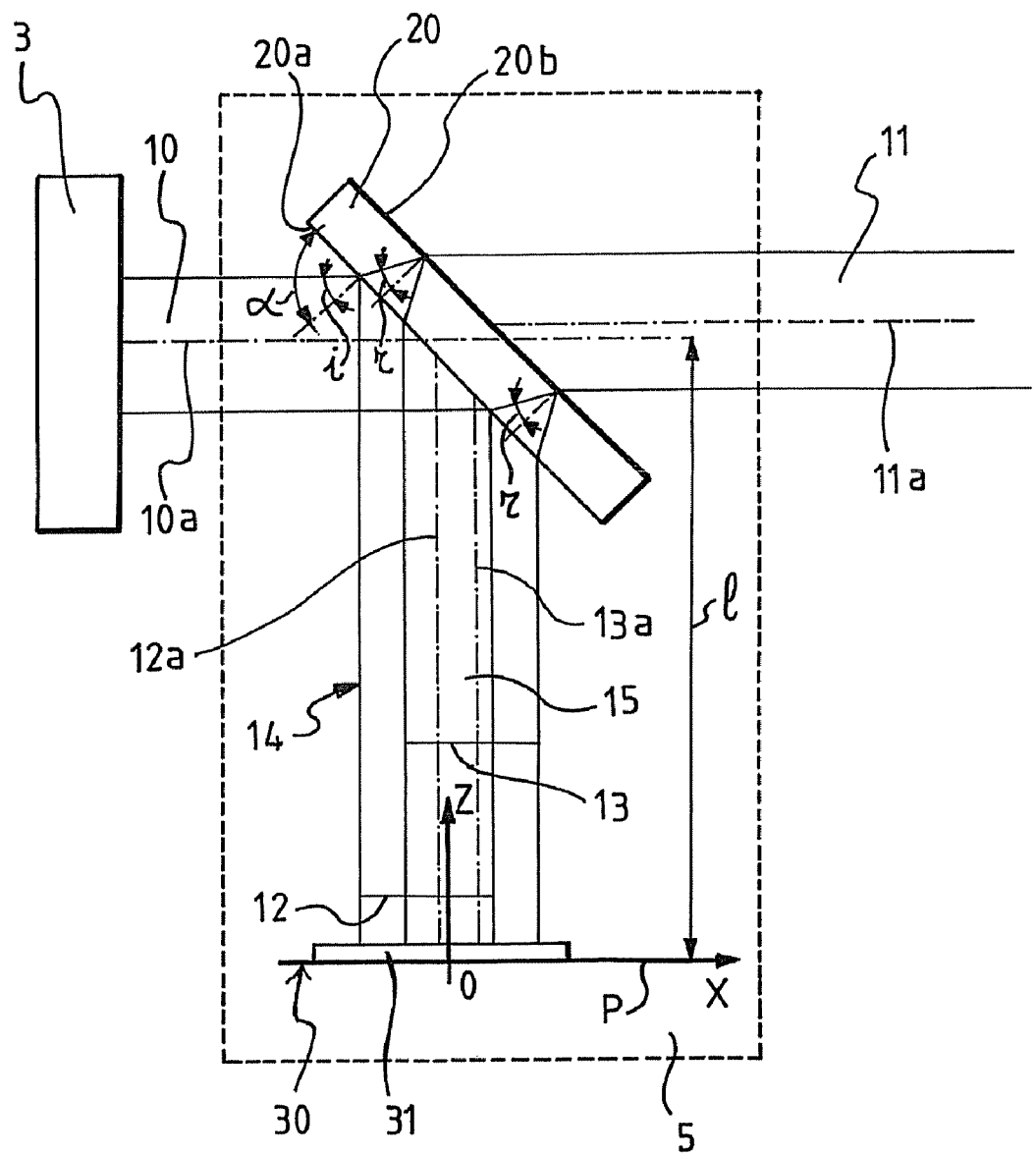
FIG. 3 is a schematic view of some components of the device of FIG. 2.

As it can be seen, for example, in FIGS. 2 and 3, in this case the detection means 5 comprises a sheet 20 with plane-parallel faces, respectively indicated with reference numerals 20a and 20b, having predetermined thickness and refractive index and located in the optical emission path 10a downstream of the focusing means 3. In particular, the sheet 20 is located at a distance from the focusing means 3 much smaller than the focusing distance D at which such means 3 focuses the light beam 10.

The sheet 20 is inclined relative to the optical emission path 10a by a predetermined angle α, preferably equal to 45°. Such sheet 20 acts as optical interferometer: it therefore generates a refracted light beam 11 that propagates along an optical path 11a substantially parallel to the optical emission path 10a and a pair of reflected light beams, indicated with reference numerals 12 and 13, which propagate along respective optical paths, indicated in FIGS. 3 and 4 with reference numerals 12a and 13a, parallel to each other and inclined by angle 2α relative to the optical emission path 10a (see, in particular, FIG. 3).

It has been experimentally proved that beams 12 and 13 have a light intensity comparable to one another and of a greater order of quantity than that of the secondary refracted beams that emerge from sheet 20 and that are generated by the chain of secondary refractions that begins in the sheet 20 starting from the light beam 13. The presence of the secondary refracted beams can therefore be disregarded.

The sheet 20, the emission source 2 and the focusing means 3 are selected so that the thickness of the sheet 20 and the diameter of the light beam 10 emitted by the source 2 are very small as compared to the focusing distance D actuated by the focusing means 3. In these conditions, the light beams 12 and 13 are partly overlapped. A reflected beam 14 is thus generated which, at a central portion thereof corresponding to the overlapping zone of the light beams 12 and 13, exhibits an interference region 15 (see FIGS. 3 and 4).

The interference region 15 defines, on an observation plane P, a plurality of interference fringes that follow one another along a direction x.

At the observation plane P, the wavefronts of the light beams 12 and 13 exhibit a radius of curvature $R_p$; such radius is smaller than the wavefront radius of curvature R of the focused light beam 10 by an amount equal to distance 1 of the observation plane P from the sheet 20 (see FIG. 3). The wavefront radius of curvature $R_p$ of the light beam 13, in turn, is smaller than the wavefront radius of curvature $R_p$ of the light beam 12 by an amount T equal to the additional path covered by the light beam 13 into the sheet 20. If r is the angle of refraction of the sheet 20 and h is the thickness thereof, such additional path is equal to T=2 h/cos(r). Since h is selected much smaller than the focusing distance D, the quantity T is negligible. Thus, the two wavefront radii of curvature $R_p$ of the light beams 12 and 13 at the observation plane P can be deemed as equal.

Figure 4:
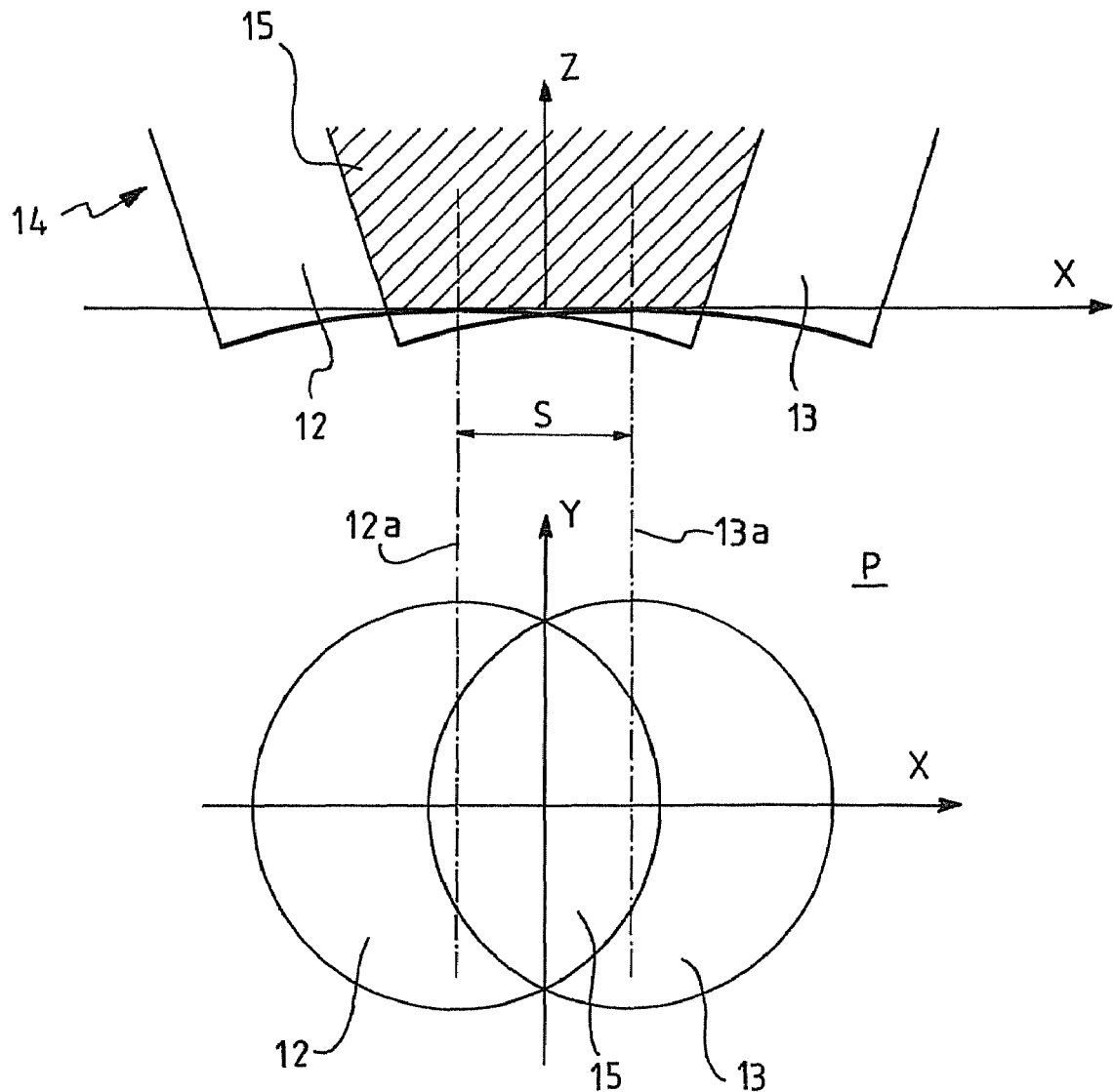
FIG. 4 is a schematic view representing the light beam coming out of a component of FIG. 3 and of a projection thereof on an observation plane.

FIG. 4 clearly shows the interference region 15 defined by the partial overlapping of the light beams 12 and 13 and the projection of the light beams 12 and 13 on the observation plane P. The optical paths 12a and 13a are spaced by a distance s. A reference system of Cartesian axes x-y is defined on plane P with origin in the centre of the interference region 15, axis x parallel to the direction in which the interference fringes follow one another, axis y parallel to the fringes themselves and extending centrally in the interference region 15 and axis z parallel to the direction of propagation of the optical paths 12a and 13a but oriented in opposite direction relative to the direction of propagation. The phase difference between the light beams 12 and 13 is given, with good approximation, by the distance, measured along the axis z, between the wavefronts of such beams 12 and 13.

Figure 5:
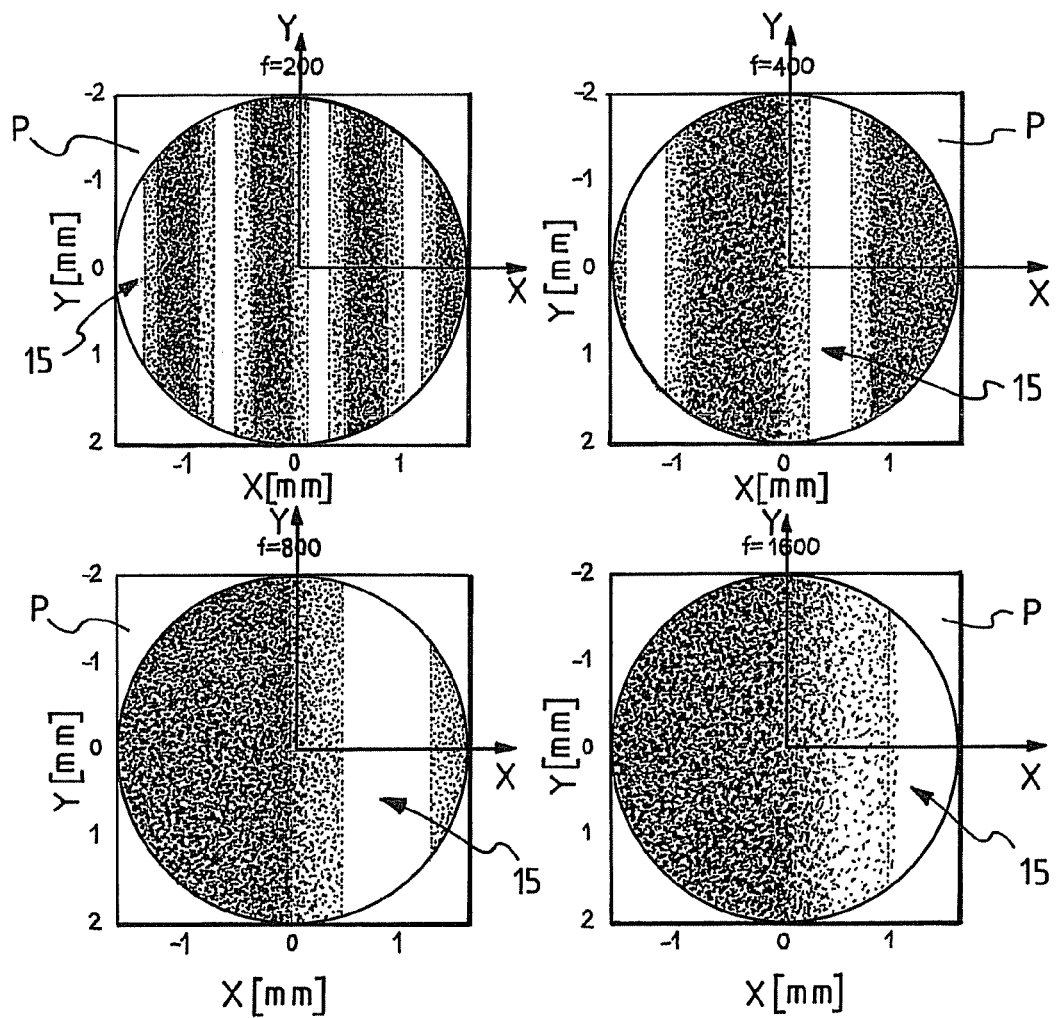
FIG. 5 shows the optical effect generated on an observation plane by the central portion of the light beam coming out of a component of FIG. 3 in different operating conditions.

FIG. 5 shows, for example, the light distribution of the interference region 15 on the observation plane P as the focusing distance D varies. The interference fringes are clearly visible. The situation shown refers to the case when a sheet is used having plane-parallel faces with a 1 mm thickness, refractive index n=1.8 for a wavelength of 658 nm, the sheet being inclined by 45° relative to the optical emission path, wherein the light beam emitted by the emission source has a diameter of 2 mm. Scales are expressed in mm and distance s between the two refracted light beams is equal to 0.604 mm.

The equations of the wavefronts of light beams 12 and 13 on the observation plane P, consisting of two spherical caps with radius $R_p$=R−1, are given by:

$$z_{12} = -R_p - \sqrt{R_p^2 - (x-s/2)^2 - y^2}$$

and $$z_{13} = -R_p - \sqrt{R_p^2 - (x+s/2)^2 - y^2}$$

respectively for the wavefront of the light beam 12 and 13.

Since the condition $R_p \gg s$ applies, where s is the distance along direction x of the optical paths 12a and 13a, the wavefronts can be approximated as follows:

$$z_{12} = -\frac{(x-s/2)^2 + y^2}{2R_p}$$

and $$z_{13} = -\frac{(x+s/2)^2 + y^2}{2R_p}$$

The phase difference between the two wavefronts is therefore given by:

$$\Delta = z_{12} - z_{13} = -\frac{(x-s/2)^2 + y^2}{2R_p} + \frac{(x+s/2)^2 + y^2}{2R_p} = \frac{s}{R_p}x$$

In the reference system x-y defined on the observation plane P, the phase difference between the wavefronts of the light beams 12 and 13 therefore is, with a good approximation, null at axis y.

The intensity profile of the interference pattern produced on the observation plane P and consisting of a plurality of interference fringes parallel to axis y is equal to:

$$I(x) = A\left[1 + \sin\left(\frac{\pi s}{2\lambda R_p}x\right)\right]$$

where A is the intensity of each light beam 12 and 13. The profile therefore is sinusoidal, with a frequency depending on the wavefront radius of curvature $R_p$ of the beams 12 and 13.

Thus, the measurement of the spatial frequency of the system of parallel fringes on the observation plane P and along the direction x provides a direct measurement of the wavefront radius of curvature of the focused light beam 10 and therefore, of the actual focusing distance D.

To this end, in the preferred embodiments of the device 1 of the present invention, the detection means 5 comprises, downstream of the sheet 20 in the optical reflection path, suitable photodetector means 30 adapted to generate a signal representative of the spatial frequency of the fringe system along the direction x of the observation plane P. Furthermore suitable processing means (not shown, for example a microprocessor or microcontroller) adapted to process the above signal for generating a signal representative of the actual focusing distance D are provided. Optionally, such processing means may also provide a numerical value representative of the actual focusing distance D.

In a particularly preferred embodiment, illustrated in FIGS. 2 and 3, the photodetector means 30 comprises, in particular, an array of photosensitive elements, globally indicated with reference numeral 31, aligned on the observation plane P along the direction x. Such photosensitive elements, for example, are part of a CCD sensor. The determination of the spatial frequency of the fringe system along direction x is obtained in this case by measuring sequentially, along the direction x, the signal coming from each photosensitive element 31. The detection of the frequency of the temporal series of measurements, in fact, is directly linked to the spatial frequency of the fringe system through the scanning speed of the array of photosensitive elements 31. In fact, the spatial frequency of the fringe system is given by:

$$f_s = \frac{s}{4\lambda R_p} \quad [\text{cycles/mm}]$$

If the array of photosensitive elements 31 has a constant pitch along the direction x and equal to $p_x$ and the scanning speed of such array of photosensitive elements 31 is equal to $S_R$ (pixels/sec), the temporal frequency of the signal coming from the sequential reading of the array of photosensitive elements 31 is:

$$f_t = \frac{s}{4\lambda R_p} S_R p_x \quad [\text{Hz}]$$

Once the temporal frequency has been detected, the processing means generate an electrical signal, which may be of current or voltage based on the processing means used, proportional to the temporal frequency detected. Such signal is compared with a reference value corresponding to the required and/or wanted focusing distance. The function that links the reference value to the wavefront radius of curvature R of the focused beam, and therefore to the focusing distance, is predetermined in the calibration step of device 1. Such function depends on the type of adjustment means used, which may consist for example of a group with a mobile coil of the voice-coil type, of a piezoelectric actuator or else. Based on the comparison with the reference value, a signal is generated which is representative of the difference between the wanted focusing distance and the actual one; such signal is then used for the feedback, when needed, on the means for adjusting the focusing distance.

The processing means may also provide a numerical value, readable by an operator, of the actual focusing distance D detected.

Figure 6:
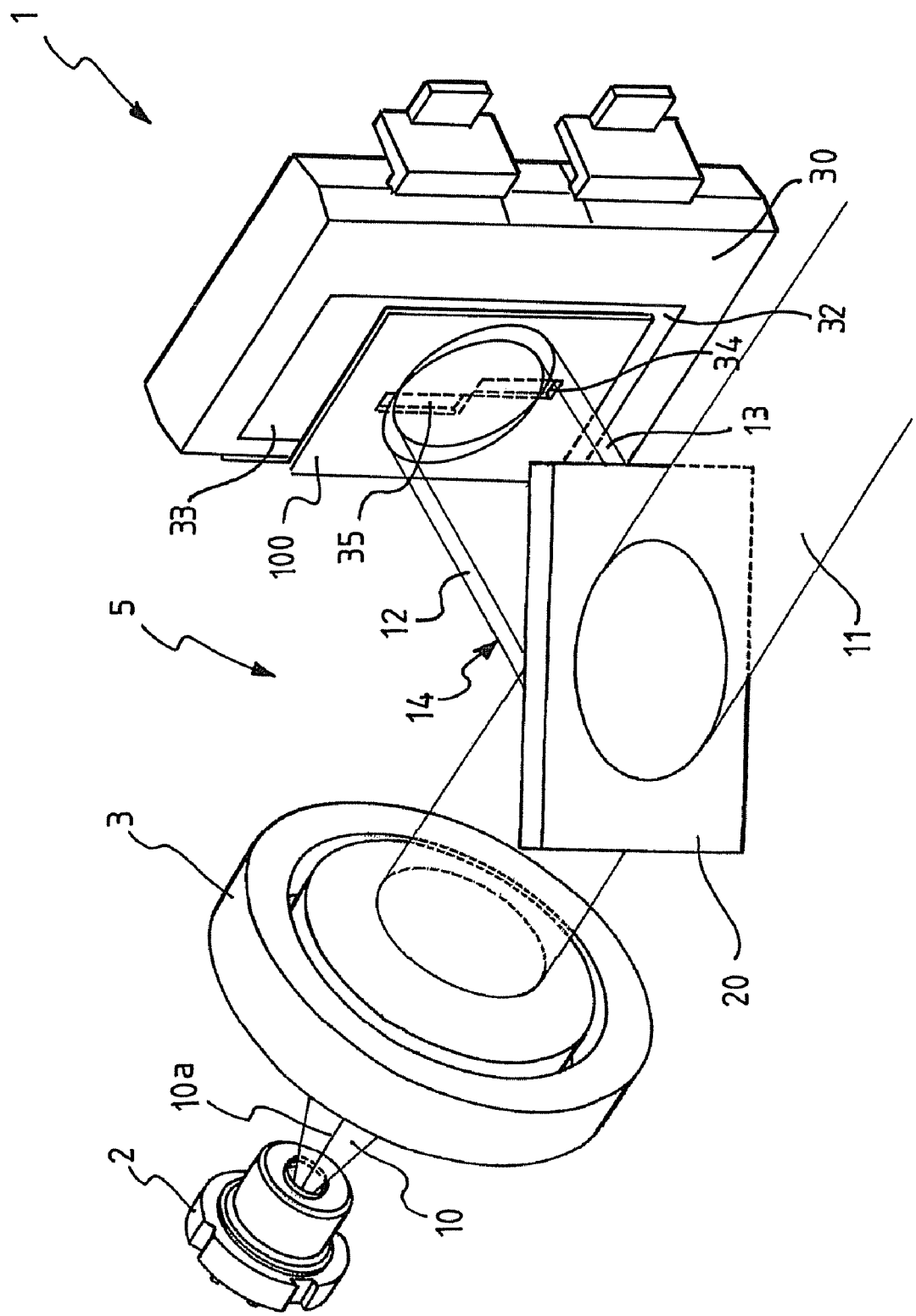
FIG. 6 is a schematic view representing part of a second embodiment of the device of the present invention.

FIG. 6 shows an alternative embodiment of the device 1 of the present invention. Such embodiment differs from the one described above only in that in this embodiment, instead of an array of photosensitive elements 31, the photodetector means comprises a pair of photodiodes, indicated with reference numerals 32 and 33, arranged downstream of the observation plane P and adapted to detect different portions of the interference region 15.

In this case, the observation plane P consists of a screen 100 having a pair of slits 34, 35 of rectangular shape. Photodiodes 32 and 33 are each arranged at a respective slit 34, 35. Slits 34, 35 allow the passage of two different portions of the interference region 15. Each of such portions is detected through a respective photodiode 32, 33.

Figure 7:
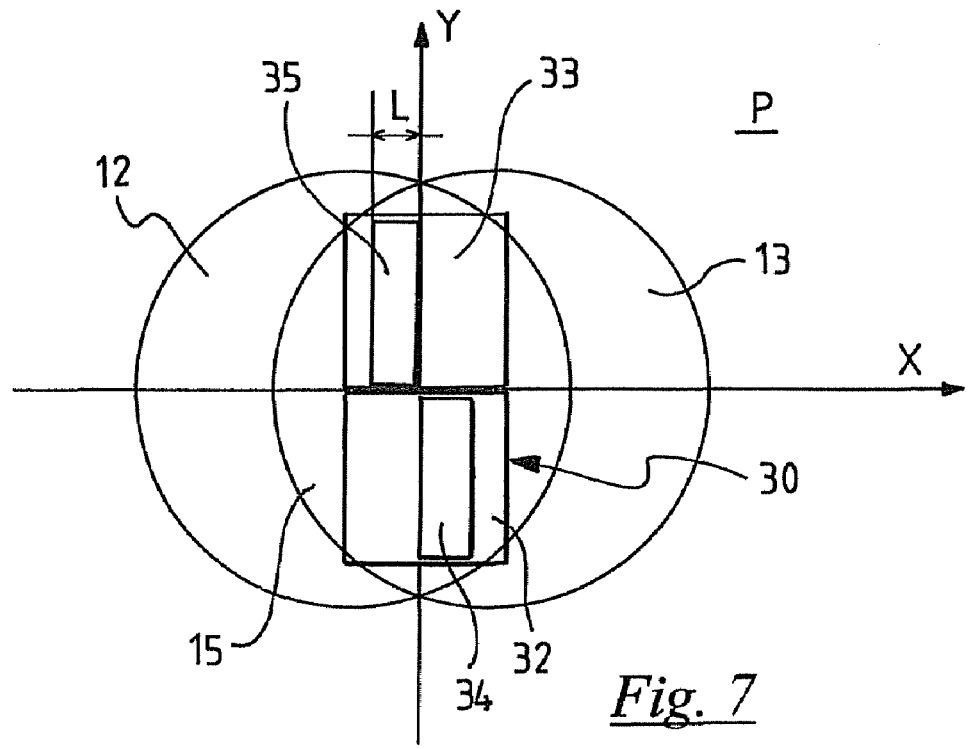
FIG. 7 is a schematic view of a component of the device of FIG. 6.

FIG. 7 clearly shows the projection of beams 12 and 13 on the observation plane P. It is possible to see the slits 34 and 35 arranged in front of the respective photodiodes 32 and 33.

The determination of the spatial frequency of the fringe system along the direction x is obtained, in this case, by calculating the difference δ between the integral of the distribution of the light intensity at the two slits 34 and 35. The preferable arrangement for the two slits actually is that shown in FIG. 7, wherein slits 34 and 35 extend from opposite sides relative to axis x and axis y. In particular, the longer sides of the slits coincide with axis y but face towards opposite sides relative to axis x and the shorter sides are parallel to axis x but face toward opposite sides relative to axis y. Specifically, in such embodiment the slit 34 extends on the fourth quadrant and the slit 35 extends on the second quadrant of the reference system x-y defined on the observation plane P.

The dimension L of slits 34 and 35 along the direction x is chosen so that the function of the difference of the integrals of the light intensity at the portion of the interference region 15 at the slits is monotonic for a predetermined range of the fringes frequency.

The choice of the reference system x-y with origin in the central point of the interference region 15, in the calculation of the integrals of the light distribution at slits 34 and 35, makes it sufficient that variable x is considered, since the dependence on y is given by a multiplicative constant.

If L is the width of the slits in direction x, the integral, between the ends 0 and L, of the function of the intensity profile of the interference pattern produced on the observation plane P, is given by:

$$H(L, R_p) = \int_0^L A[1 + \sin(\pi s x / 2\lambda R_p)]dx$$
$$= \left[A\left(x + \frac{1}{2}\sin\frac{\pi s x^2}{2\lambda R_p}\right)\right]_0^L$$
$$= A\left(L + \frac{1}{2}\sin\frac{\pi s L^2}{2\lambda R_p}\right)$$

The same integral, defined by ends −L and 0, is:

$$H(-L, R_p) = A\left(L - \frac{1}{2}\sin\frac{\pi s L^2}{2\lambda R_p}\right)$$

and hence, the difference between such integrals is:

$$\delta(L, R_p) = H(L, R_p) - H(-L, R_p) = A\sin\frac{\pi s L^2}{2\lambda R_p}$$

The function δ(L), when a range of focusing distances (and thus, a range of radii of curvature Rmin and Rmax) is defined, is monotonic only if the integration dimension L is smaller than the value for which $\delta(L, R_{min})$ reaches the first relative maximum. When such conditions are met, the difference of the signals produced by photodiodes 32 and 33 is proportional to the focusing distance D.

The Applicant has found that using a sheet with plane-parallel faces with a 1 mm thickness, refractive index n=1.8 for a wavelength of 658 nm, inclined by 45° relative to the optical emission path, if the required focusing range is 800 to 1600 mm, the width L of the slits must be less than 1.02 mm, whereas if the range is 500 to 1600 mm, width L must be less than 0.81 mm and if the range is 200 to 1600 mm, width L must be less than 0.52 mm.

Once the above difference δ has been calculated, the processing means generates a signal (in particular, a current or voltage depending on the processing means used) proportional to such difference. Such signal is compared with a reference value corresponding to the required and/or wanted focusing distance. As for the previous embodiment, the function that links the reference value to the wavefront radius of curvature, and therefore to the focusing distance, is predetermined in the calibration step of device 1 and depends on the type of moving means used.

Based on the comparison with the reference value, a signal is generated which is representative of the difference between the required focusing distance and the actual one; such signal is then used for the feedback, when needed, on the means for adjusting the focusing distance.

The processing means may also provide a numerical value, readable by an operator, of the actual focusing distance D detected.

Figure 8:
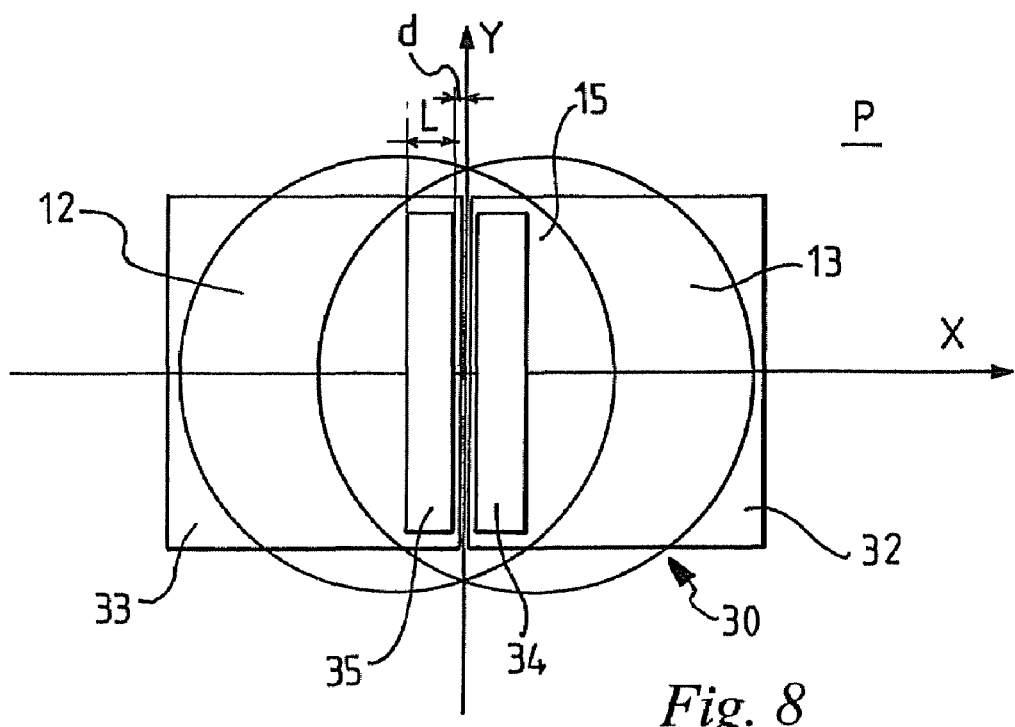
FIG. 8 is a schematic view of a component usable in the device of FIG. 6 as an alternative to the component of FIG. 7.

In an alternative embodiment illustrated in FIG. 8, the two slits 34, 35 extend symmetrically relative to axis y and are spaced relative to the axis by a predetermined distance d. Specifically, in such embodiment slit 34 is placed on the first and fourth quadrant of the reference system x-y whereas slit 35 is placed on the second and third quadrant. As for the rest, all the remarks made with reference to the embodiment of FIG. 6 apply. However, this alternative embodiment is less advantageous than the previous one since the integration area is smaller because the two slits 34 and 35 are not adjacent to axis y. In fact, the variation of the fringe frequency being equal, a greater variation of function δ(L) and therefore a greater sensitivity and thus, higher accuracy in the adjustment of the moving, is associated with the configuration of FIG. 7.

Figure 9:
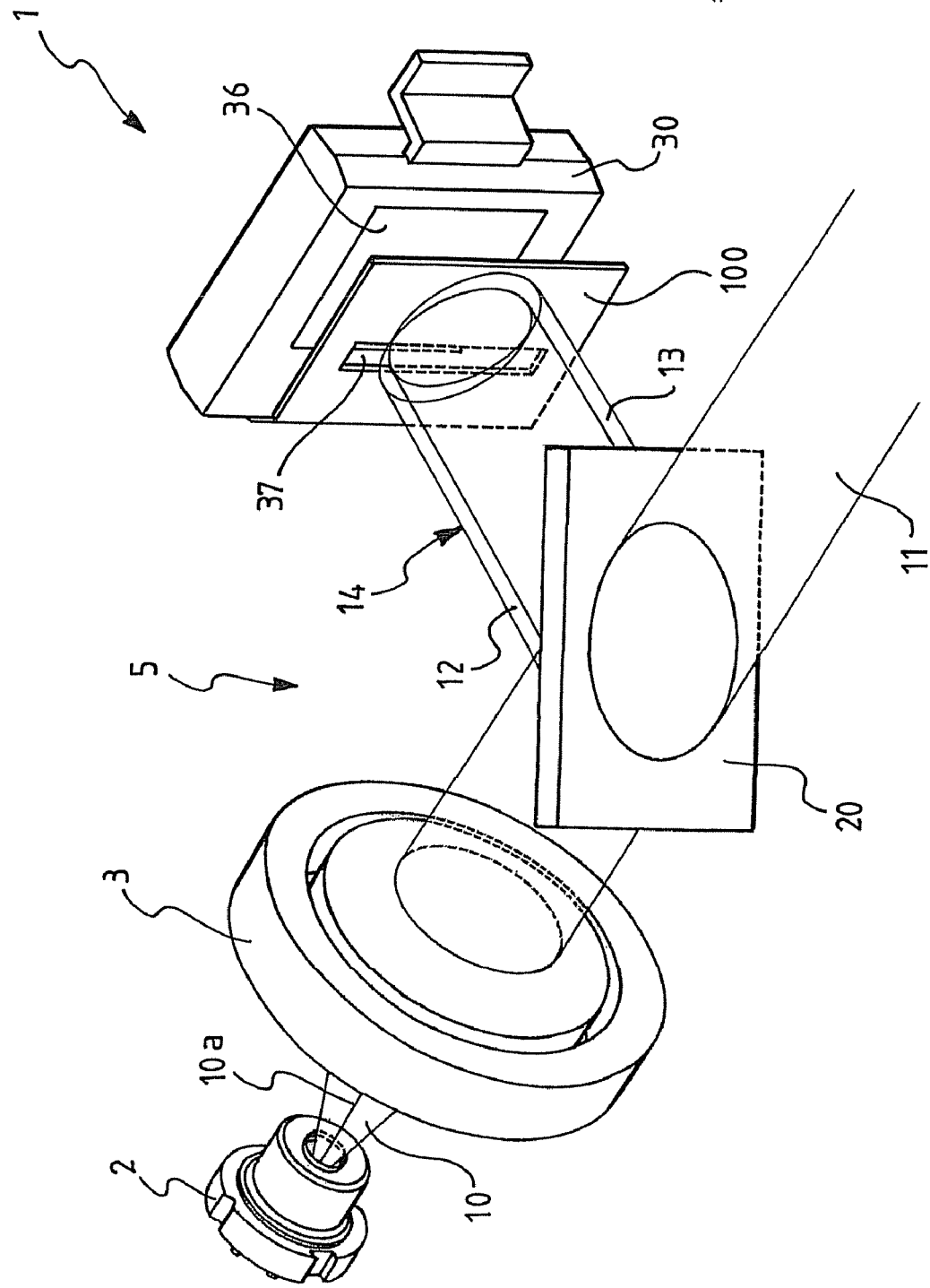
FIG. 9 is a schematic view representing part of a third embodiment of the device of the present invention.

FIG. 9 shows a further optional embodiment which differs from that of FIG. 6 only in that the detection means 30 comprises a single photodiode 36 and a single slit 37 is provided on the screen 100.

Figure 10:
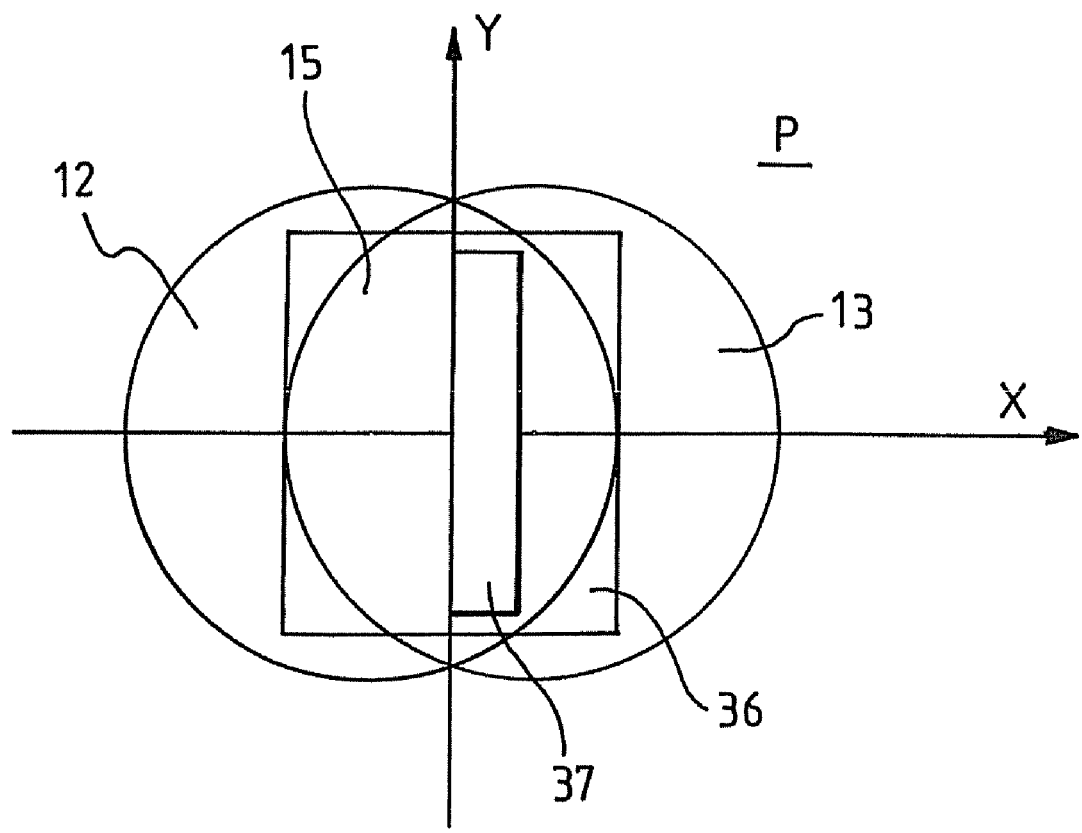
FIG. 10 is a schematic view of a component of the device of FIG. 9.

FIG. 10 clearly shows the projection of the beams 12 and 13 on the observation plane P. It is possible to see the slit 37 arranged in front of photodiode 36.

The determination of the spatial frequency of the fringe system along the direction x is obtained, in this case, by calculating the integral of the distribution of the light intensity at the slit 37. The preferable arrangement for the slit 37 actually is that shown in FIG. 10, wherein a longer side of the slit 37 is overlapped to axis y and the slit extends on opposite sides of the observation plane P relative to axis x. Specifically, in such embodiment the slit 37 extends on the first and fourth quadrant of the reference system x-y defined on the observation plane P but it could also extend on the second and third quadrant. The dimension L of the slit 37 along the direction x is selected so that the integral function of the portion of the interference region 15 at the slit 37 is monotonic for a predetermined range of the fringe frequency.

Once the above integral has been calculated, the processing means generates a signal proportional to such integral. As for the previous embodiments, such signal is compared with a reference value corresponding to the required and/or wanted focusing distance. The function that links the reference value to the wavefront radius of curvature, and therefore to the focusing distance, is predetermined in the calibration step of device 1 and depends on the type of moving means used.

Based on the comparison with the reference value, a signal is generated which is representative of the difference between the wanted focusing distance and the actual one; such signal is then used for the feedback, when needed, on the means for adjusting the focusing distance.

The processing means may also provide a numerical value, readable by an operator, of the actual focusing distance D detected.

An alternative solution, not shown, provides for the use of a single rectangular slit having the two longer sides parallel to axis y, but none of them coinciding therewith. All the remarks made with reference to the embodiment of FIG. 9 apply to this solution.

Figure 11:
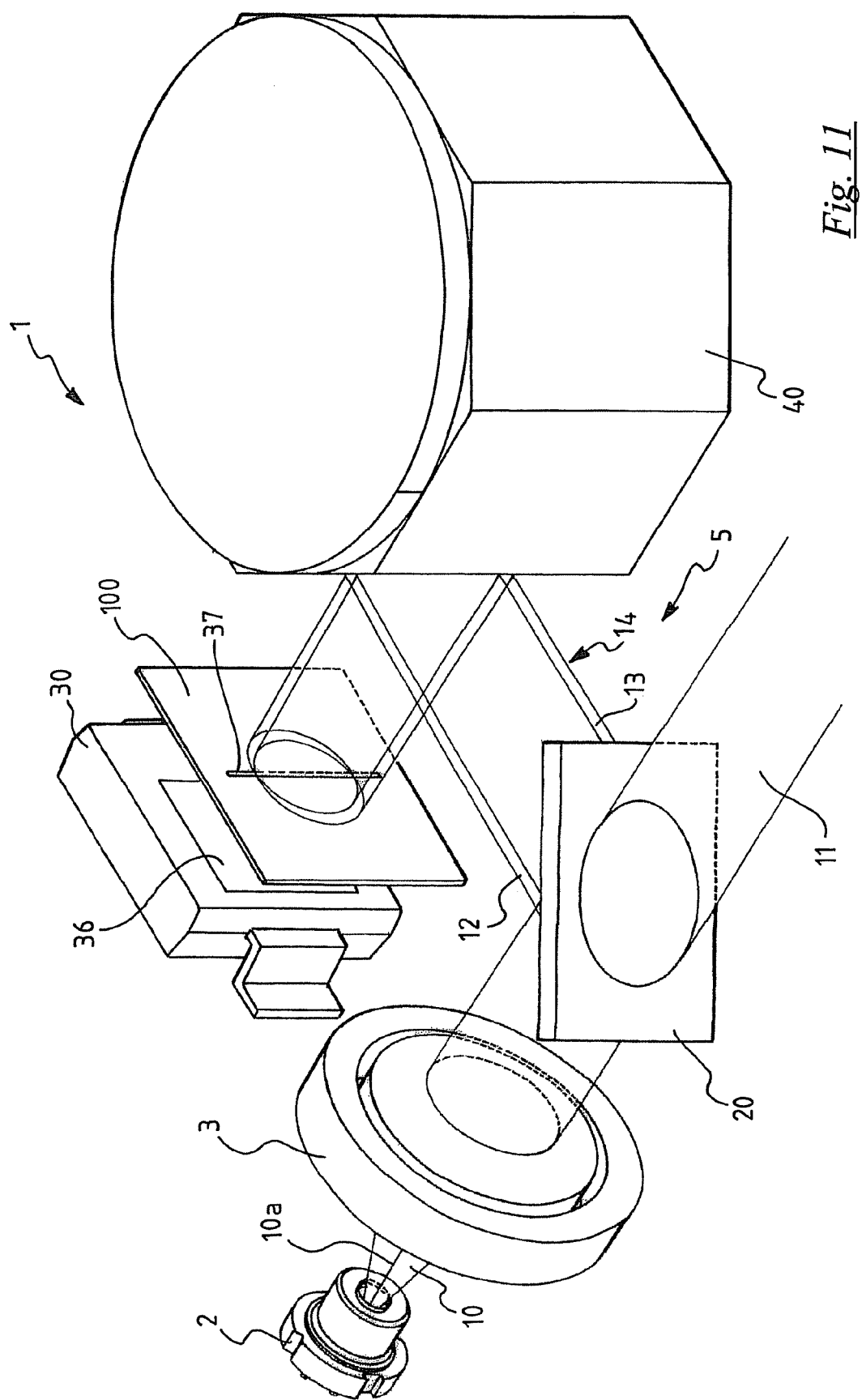
FIG. 11 is a schematic view representing part of a fourth embodiment of the device of the present invention.

FIG. 11 shows a further optional embodiment of the device 1 of the present invention. Such embodiment differs from all the embodiments described above only in that in the optical reflection path, between the sheet 20 and the observation plane P, a conventional rotating polygonal mirror 40 is provided.

FIG. 11 shows a specific embodiment wherein the photo-detector means 30 comprises a photodiode 36 and the observation plane P comprises a screen 100 with a corresponding slit 37, as in the embodiment described above with reference to FIG. 9.

In the embodiment of FIG. 11, the interference region 15 is made to pass through the slit 37. Such passage determines a modulation of the light intensity of the interference region 15. Letting $v_s$ the linear speed at which the light beams 12 and 13 are made to move on the slit 37, the modulation frequency of the portion of the interference region 15 that crosses slit 37 is given by:

$$f_m = f_s v_S = \frac{s}{4\lambda R_p} v_S \quad [Hz]$$

where $f_s$ is the spatial frequency of the fringe system along the direction x.

Once the modulation frequency $f_m$ has been detected, the processing means calculates the spatial frequency and generates a signal proportional to such frequency. As for the embodiments described above, such signal is compared with a reference value corresponding to the required and/or wanted focusing distance.

Based on the comparison with the reference value, a signal is generated which is representative of the difference between the wanted focusing distance and the actual focusing distance; such signal is then used for the feedback, when needed, on the means for adjusting the focusing distance.

The processing means may also provide a numerical value, readable by an operator, of the actual focusing distance D detected.

All the above embodiments have the advantage of allowing a continuous detection of the focusing distance and thus, the possibility of adjusting such distance in real time. This is possible thanks to the fact that the means for detecting the focusing distance are located upstream of the means for scanning the laser light beam and thus, they are totally independent of one another.

Figure 12:
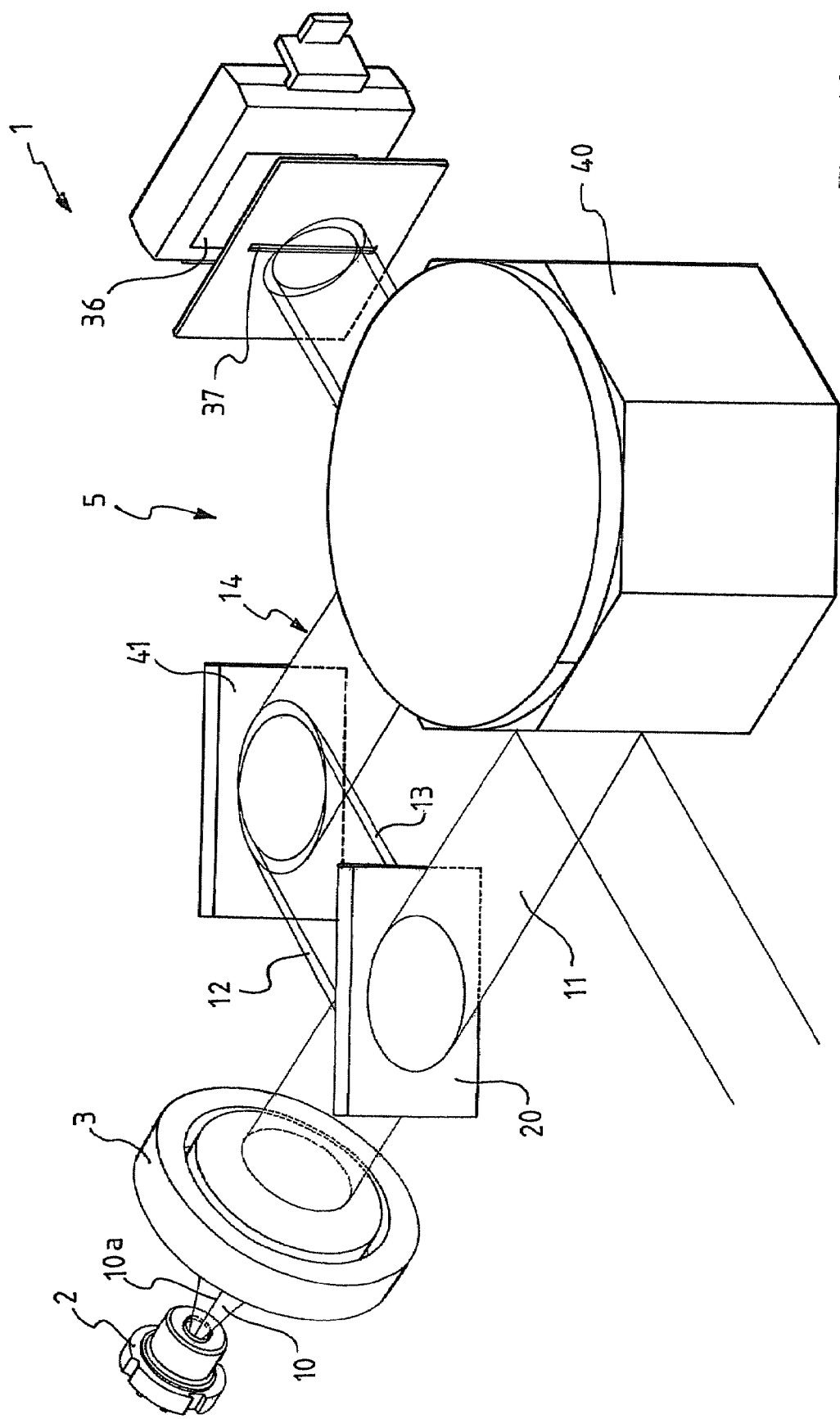
FIG. 12 is a schematic view representing part of a fifth embodiment of the device of the present invention.

FIG. 12 shows a further alternative embodiment of the device 1 of the present invention. Such embodiment differs from that of FIG. 11 only in that the rotating polygonal mirror 40 is the same mirror that scans the refracted light beam 11 intended for sweeping the optical code to be read. In such embodiment, in the optical reflection path, between the sheet 20 and the polygonal rotor 40, a deflecting mirror 41 is provided. As for the rest, all the remarks made with reference to the embodiment illustrated in FIG. 11 apply.

Optionally, in place of the photodiode 36 it is possible to place a light guide (such as an optical fiber) which carries the modulation of light intensity to the same photodiode used for detecting the light diffused by the optical code. In this case, the positioning of the mirror 41 and of the slit 37 must be such that the detection of the intensity modulation coming from the light guide is temporally different from the detection of the light diffused by the optical code.

This embodiment is particularly advantageous since it uses a same photodiode both for detecting the focusing distance and for detecting the information contents of the optical code.

Figure 13:
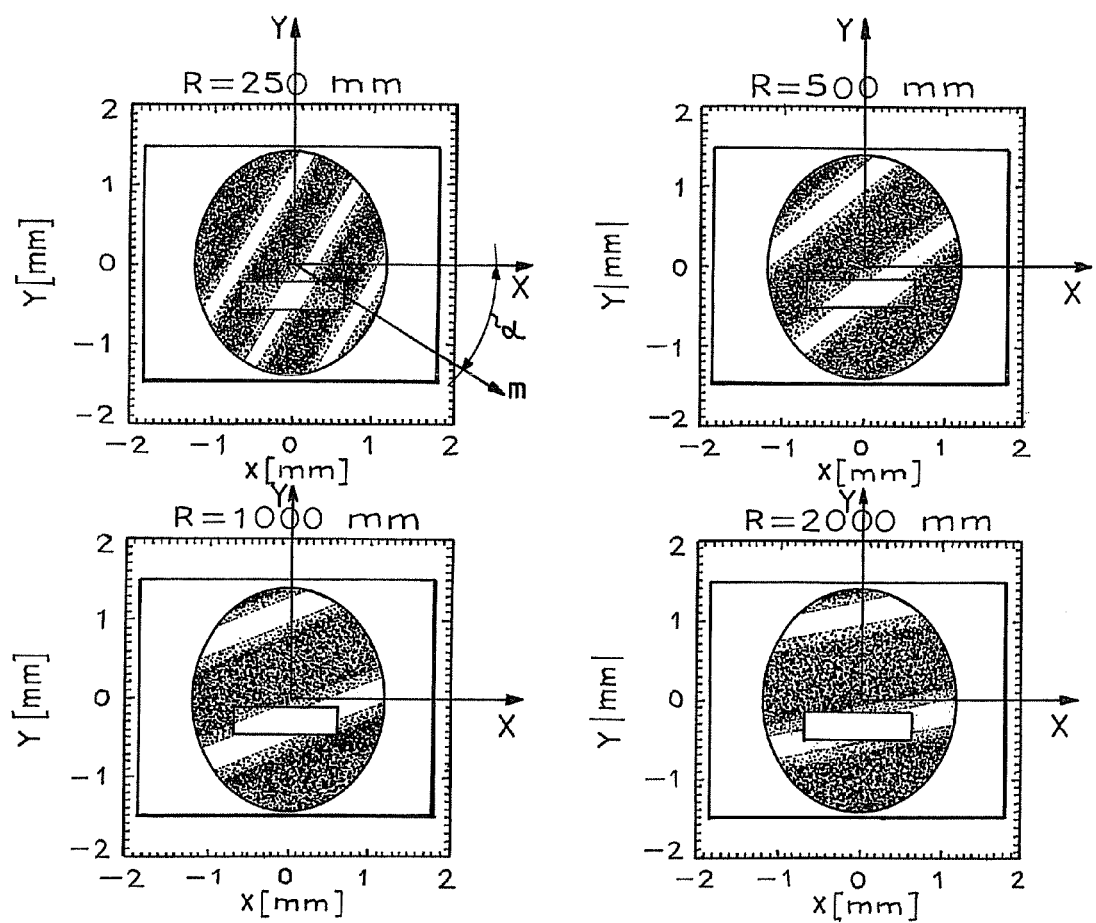
FIG. 13 shows the optical effect generated on an observation plane by the central portion of the light beam coming out of a variation of one of the components of FIG. 3 in different operating conditions.

FIG. 13 shows the light distribution of the interference region 15 on the observation plane P in the case of a further embodiment of the device 1 of the present invention. Such embodiment differs from the others only in that the sheet 20, instead of having plane-parallel faces, comprises plane faces forming such an angle θ with each other as to allow overlapping of the light beams. It can be seen that the interference region 15 forms a system of parallel fringes on plane P that follow one another along a direction m inclined relative to axis x by a predetermined angle α.

In the specific example illustrated, a sheet was used which consists of Schott BK7 glass, having thickness equal to 1 mm and angle θ equal to 0.1° and several measurements were made as the focusing distance changed (and therefore, the wavefront radius of curvature R of the focused light beam). It is possible to see that as the radius of curvature varies, the inclination angle α of the fringes varies.

The spatial frequency of such fringe system, in fact, is correlated to the angle α by the following relation:

$$\sin\alpha = \frac{sf_s}{\lambda R}$$

where s is the distance between optical paths 12a and 13a on the observation plane P.

The measurement of the angle α of rotation of the fringe system is therefore directly linked to the wavefront radius of curvature of the focused beam 10. A method for determining the angle α is described, for example, in U.S. Pat. Nos. 4,604,739 and 5,446,710. In such patents, the detection of the radius of curvature of the wavefront reflected by an optical support is carried out through a quadrant photodiode, that is, a photodiode consisting of four photosensitive elements placed side by side. The difference of the signal on the four photosensitive elements that occurs due to the fringe rotation is correlated to the angle of rotation of the fringes, and therefore to the wavefront radius of curvature of the focused light beam. Optionally, the measurement of the angle α can be carried out through other types of sensors or with a suitable arrangement of a slit in front of a photodiode. In particular, the slit can be arranged parallel to axis x, as illustrated in FIG. 13.

The device 1 of the present invention, in the various embodiments thereof described above, allows carrying out a method for focusing a laser light beam, comprising the steps of:

emitting a laser light beam 10 along an optical emission path 10a;
focusing the light beam 10 in a focusing point F located at a focusing distance D;
detecting the actual focusing distance D;
adjusting the position of the above focusing point F based on the detected current focusing distance D;

wherein the step of detecting the focusing distance comprises the step of detecting a parameter characteristic of the focused beam and representative of the focusing distance, the characteristic parameter being the wavefront radius of curvature of the focused beam.

The step of detecting the focusing distance D and the step of adjusting the position of the focusing point F based on the detected focusing distance D are repeated iteratively until a wanted focusing distance is reached.

The step of detecting the focusing distance D may comprise a step of calculating the actual value of such distance.

The step of detecting the focusing distance D comprises, in particular, the steps of:

generating a reflected beam 14 that propagates along an optical reflection path inclined relative to the optical emission path 10a, the reflected beam 14 comprising a pair of light beams 12 and 13 partly overlapped and defining an interference region 15;
detecting the reflected beam 14 for generating a signal representative of a parameter characteristic of the interference region 15;
processing the above signal for generating a signal indicative of the actual focusing distance D.

The above processing step comprises, in particular, the step of determining the spatial frequency of a plurality of interference fringes defined by the interference region 15 on an observation plane P located in the optical reflection path, the interference fringes following one another along a direction of succession of the fringes.

The step of determining the spatial frequency of the plurality of fringes comprises, in particular, the steps of:

selecting at least one portion of the interference region 15 for generating a signal representative of the light intensity of the at least one portion of the interference region 15;
calculating the integral of the light intensity of the at least one portion of the interference region for a predetermined range of spatial frequencies.

Figure 14:
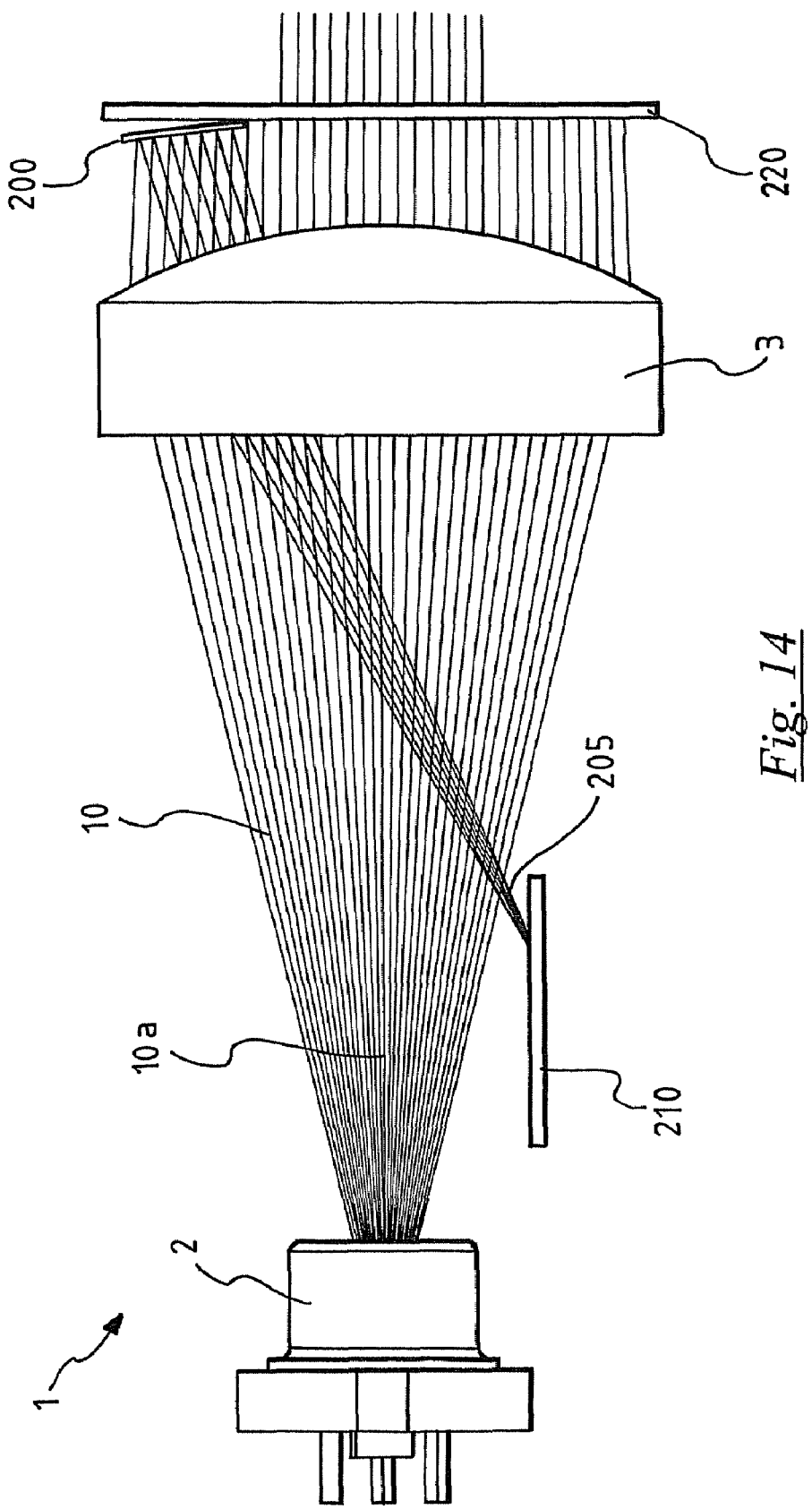
FIG. 14 is a schematic view representing part of a sixth embodiment of the device of the present invention.

In a further embodiment of the device 1 of the present invention, illustrated in FIG. 14, the detection means 5 comprises a mirror-like surface 200 associated with an aperture diaphragm 220 arranged downstream of the focusing means 3 along the optical emission path 10a. Such a mirror-like surface 200 is inclined with respect to the optical emission path 10a such as to return backwards, through the same focusing means 3, a marginal portion 205 of the focused light beam 10 on a position different from that of the emission source 2. The marginal portion 205 subtracted from the light beam 10 does not change the features thereof, since in any case it would be intercepted by the aperture diaphragm 220, which is needed to give to the beam the appropriate diameter for the expected use.

The detection means 5 further comprises an optical sensor 210 integrally associated with the emission source 2 of the light beam 10 and sensitive to the incidence position of the marginal portion 205 returned backwards for generating a signal representative of the variation of such incidence position. For example, the optical sensor 210 may be a conventional PSD. Alternatively, the sensor may consist of an array of photoelements, such as a CCD.

The incidence position of the marginal portion 205 of the light beam returned backwards by the mirror-like surface 200 depends, the inclination of the mirror-like surface 200 relative to the optical emission path 10a being equal, on the radius of curvature of the focused laser light beam and thus, on the actual focusing distance D. If the mirror-like surface 200 were not inclined, the beam portion 205 returned backwards would go back to source 2, as this would be the point conjugate to the focus. The inclination of the mirror-like surface 200, instead, moves the beam portion 205 returned backwards to a decentralized position relative to source 2. Once a predetermined inclination has been established, the detection of the position wherein such beam portion 205 impinges the optical sensor 210 therefore provides a measurement of the actual focusing distance.

Suitable processing means processes the signal generated by the optical sensor 210 for generating a signal proportional to the incidence position of the marginal portion 205 returned backwards. Such signal is compared with a reference value corresponding to the required and/or wanted focusing distance. As for the previous embodiments, the function that links the reference value to the wavefront radius of curvature (through the incidence position of the marginal portion 205 on the optical sensor 210), and therefore to the focusing distance, is predetermined in the calibration step of device 1 and depends on the type of moving means used.

Based on the comparison with the reference value, a signal is generated which is representative of the difference between the wanted focusing distance and the actual focusing distance; such signal is then used for the feedback, when needed, on the means for adjusting the focusing distance.

The processing means may also provide a numerical value, readable by an operator, of the actual focusing distance D detected.

Also this embodiment has the advantage of allowing a continuous detection of the focusing distance and thus, the possibility of adjusting such distance in real time.

The device 1 of the present invention, in the embodiment of FIG. 14, allows carrying out a method for focusing a laser light beam, comprising the steps of:

emitting a laser light beam 10 along an optical emission path 10*a*;

focusing the light beam 10 in a focusing point F located at a focusing distance D;

detecting the actual focusing distance D;

adjusting the position of the above focusing point F based on the detected focusing distance D;

wherein the step of detecting the focusing distance D comprises the steps of:

returning backwards, along an optical path inclined relative to the optical emission path 10*a*, a marginal portion 205 of the focused light beam;

detecting, through a position sensor 210, such marginal portion 205 returned backwards for generating a signal representative of the position wherein the marginal portion 205 returned backwards impinges the position sensor 210;

processing the signal for generating a signal representative of the actual focusing distance D.

The step of detecting the focusing distance D and the step of adjusting the position of the focusing point F based on the detected focusing distance D are repeated iteratively until a wanted focusing distance is reached.

The step of detecting the actual focusing distance D may comprise a step of calculating the current value of such distance.

Figure 15:
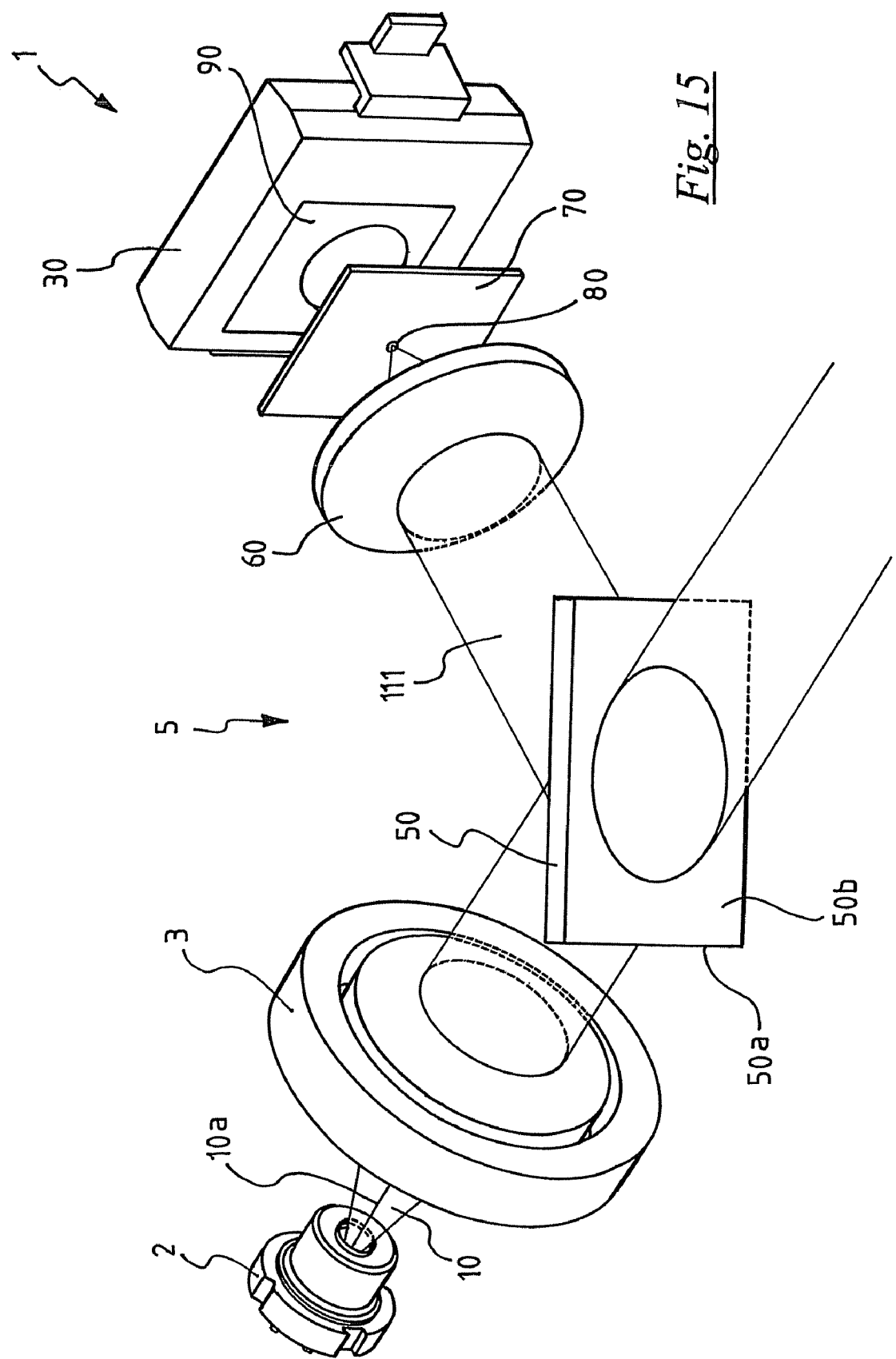
FIG. 15 is a schematic view representing a further focusing device according to the present invention.

FIG. 15 shows a focusing device 1 comprising, besides the emission source 2 and the focusing means 3 discussed above, a sheet 50 having predetermined thickness and refractive index and provided with plane-parallel faces. One of such faces is treated so as to generate a single reflected beam 111 that propagates along a respective optical reflection path inclined relative to the optical emission path. In particular, face 20*a* can be treated with antireflective coating or face 20*b* can be treated with partially reflective coating, or both.

In the reflected optical path is provided means 60 for focusing the reflected beam 111, such means 60 being adapted to focus the reflected beam 111 at a predetermined distance. In the reflected optical path, downstream of the focusing means 60, is provided a diaphragm 70 having an aperture 80 concentric to the reflected light beam 111, so as to let only a central portion of the light beam pass therethrough. The aperture 80 has a diameter equal to the diameter of the reflected light beam 111 at the diaphragm 70, measured in an operating condition wherein the focusing means 3 focuses the light beam 10 emitted by the emission source 2 at a maximum or minimum focusing distance D, that is, corresponding to one of the two required focusing ends Dmin and Dmax.

In the reflected optical path, downstream of diaphragm 70, a photodiode 90 is provided. Such photodiode 90 is adapted to generate a signal bi-uniquely correlated to the focusing distance D, in particular such signal being representative of the variation of light intensity of the central portion of the reflected light beam 111 as the focusing distance D decreases or increases. In fact, as such focusing distance increases or decreases, means 60 focuses the reflected light beam 111 at a different distance than the previous operating condition, thus determining an increase of the diameter of the reflected light beam 111 at the diaphragm 70 and a corresponding decrease of the portion of such light beam that passes through the aperture 80.

Suitable processing means processes the signal generated by the photodiode 90 for generating a signal proportional to the variation of light intensity of the central portion of the reflected light beam 111. Such signal is generated through a known relation between a plurality of values of such signal and a corresponding plurality of focusing distances. Such relation is predetermined during the calibration step.

Such signal is then used for the feedback, when needed, on the means for adjusting the focusing distance.

This embodiment has the advantage of allowing a continuous detection of the focusing distance and thus, the possibility of adjusting such distance in real time. This is possible thanks to the fact that the means for detecting the focusing distance are located upstream of the means for scanning the laser light beam and thus, they are totally independent of one another.

The device 1 of the present invention, in the embodiment of FIG. 15, allows carrying out a method for focusing a laser light beam, comprising the following steps:

emitting a laser light beam 10 along an optical emission path 10*a*;

focusing the light beam 10 in a focusing point F located at a focusing distance D;

detecting the actual focusing distance D;

adjusting the position of the above focusing point F based on the detected current focusing distance D;

wherein the step of detecting the focusing distance D comprises the steps of:

generating a reflected light beam (111) that propagates along a reflected optical path inclined relative to the optical emission path (10*a*);

focusing the reflected light beam (111) at a predetermined distance;

selecting a central portion of the reflected light beam (111) through a diaphragm (70) having a circular aperture (80) concentric to the reflected light beam (111) and with a diameter equal to the diameter of the reflected light beam (111) when the emitted light beam (10) is focused at a maximum or minimum focusing distance (D);

detecting the central portion of the reflected light beam (111) for generating a signal representative of the variation of the light intensity of the central portion of the reflected light beam (111) as the focusing distance (D) decreases or increases;

processing the signal for generating a signal indicative of the focusing distance (D).

The step of detecting the focusing distance D and the step of adjusting the position of the focusing point F based on the detected focusing distance D are repeated iteratively until a wanted focusing distance is reached.

The step of detecting the actual focusing distance D may comprise a step of calculating the actual value of such distance.

The device 1 of the present invention, in the various embodiments thereof described above, advantageously allows an accurate and reliable automatic (and, if needed, continuous and real time) adjustment of the wanted focusing distance irrespective of the occurrence of possible positioning errors and/or undesired movements of the mechanical and optical parts of the device itself and/or errors on the determination of the focal length of the optical focusing system.

What is claimed is:

1. A device for focusing a laser light beam, comprising:
   an emission source of a laser light beam along an optical emission path;
   first focusing means of the laser light beam in a focusing point (F) located at a focusing distance (D);
   means for adjusting the position of the focusing point (F) relative to the device; and
   means for detecting the focusing distance (D) active in feedback on the adjustment means,
   wherein the detection means is optically in between the first focusing means and the focusing point (F) and detects a wavefront radius of curvature of the light beam;
   wherein the detection means comprises:
   a glass sheet of predetermined thickness and refraction index, arranged in the optical emission path downstream of the first focusing means and adapted to generate a reflected light beam that propagates along a reflected optical path inclined relative to the optical emission path, the reflected light beam being defined by a pair of light beams partly overlapped and defining an interference region;
   photodetector means arranged in the reflected optical path and adapted to generate a signal representative of a parameter characteristic of the interference region; and
   means for processing the signal so as to generate a signal indicative of the wavefront radius of curvature.

2. The device according to claim 1, wherein the detection means calculates a value of the focusing distance (D).

3. The device according to claim 1, wherein the parameter characteristic of the interference region is the spatial frequency of a plurality of interference fringes defined by the interference region on an observation plane (P) located in the reflected optical path.

4. The device according to claim 3, wherein the photodetector means comprises an array of photosensitive elements arranged on the observation plane (P) along a direction (x) of succession of the fringes.

5. The device according to claim 3, wherein the observation plane (P) comprises at least one slit adapted to allow the passage of at least one portion of the interference region and the photodetector means comprises at least one photosensitive element arranged in the reflected optical path downstream of the at least one slit.

6. The device according to claim 5, wherein the at least one slit is rectangular, with a shorter side oriented along a direction (x) of succession of the fringes.

7. The device according to claim 6, wherein the at least one slit has a dimension, along the direction (x) of succession of the fringes, such that, for a predetermined range of the frequency of the fringes, an integral function of the light intensity of the reflected light beam at the at least one portion of interference region is monotonic.

8. The device according to claim 7, wherein the observation plane (P) comprises two slits and the photodetector means comprise two photosensitive elements, one for each of the two slits.

9. The device according to claim 5, wherein the observation plane (P) comprises a single slit and the photodetector means comprises a single photosensitive element.

10. The device according to claim 9, wherein the single slit has a pair of longer sides parallel to a first symmetry axis (y) of the interference region perpendicular to the direction (x) of succession of the fringes and extends on opposite sides of the observation plane (P) relative to a second symmetry axis (x) of the interference region parallel to the direction (x) of succession of the fringes.

11. The device according to claim 10, wherein a longer side of the pair of longer sides is overlapped to the first symmetry axis (y).

12. The device according to claim 5, wherein the observation plane (P) comprises two slits and the photodetector means comprise two photosensitive elements, one for each of the two slits.

13. The device according to claim 12, wherein the two slits are formed on opposite sides of the observation plane (P) relative to a first symmetry axis (y) of the interference region perpendicular to the direction (x) of succession of the fringes.

14. The device according to claim 13, wherein the two slits have a longer side coinciding with the first symmetry axis (y) and are formed on opposite sides relative to a second symmetry axis (x) of the interference region parallel to the direction (x) of succession of the fringes.

15. The device according to claim 13, wherein the two slits extend symmetrically relative to the first symmetry axis (y) on opposite sides of the observation plane (P) relative to a second symmetry axis (x) of the interference region parallel to the direction (x) of succession of the fringes and are spaced relative to the first symmetry axis (y) by a predetermined distance.

16. The device according to claim 3, further comprising a rotating polygonal mirror arranged in the reflected optical path between the sheet and the observation plane (P).

17. The device according to claim 16, further comprising at least one deflecting mirror arranged in the reflected optical path between the sheet and the rotating polygonal mirror and wherein the rotating polygonal mirror is also active on a refracted light beam generated by the sheet.

18. The device according to claim 1, wherein the sheet comprises opposite plane-parallel faces of reflecting material.

19. The device according to claim 1, wherein the sheet comprises opposite plane faces of reflecting material forming an angle θ with each other.

20. A device for focusing a laser light beam, comprising:
   an emission source of a laser light beam along an optical emission path;
   first focusing means of the laser light beam in a focusing point (F) located at a focusing distance (D);
   means for adjusting the position of the focusing point (F) relative to the device;
   means for detecting the focusing distance (D) active in feedback on the adjustment means, wherein the detection means is arranged optically in between the first focusing means and the focusing point (F), wherein the detection means comprises:
   a sheet of predetermined thickness and refractive index, the sheet being arranged downstream of the first focusing means along the optical emission path and adapted to generate a reflected light beam that propagates along a reflected optical path inclined relative to the optical emission path;

second focusing means arranged in the reflected optical path for focusing the reflected light beam at a predetermined distance;

a diaphragm arranged in the reflected optical path downstream of the second focusing means and having an aperture concentric to the reflected light beam so as to let only a central portion of the reflected light beam pass therethrough, wherein the aperture has a diameter equal to the diameter of the reflected light beam, at the diaphragm, when the first focusing means focus the light beam emitted by the emission source at a maximum or minimum focusing distance (D);

photodetector means arranged in the reflected optical path downstream of the diaphragm and adapted to generate a signal representative of the variation of light intensity of the central portion of the reflected light beam as the focusing distance increases or decreases; and means for processing the signal for generating a signal indicative of the focusing distance (D).

21. The device according to claim 20, wherein the processing means calculates a value of the focusing distance (D).

22. The device according to claim 20, wherein the sheet comprises opposite plane-parallel faces, one of the opposite faces being treated with an antireflective coating.

23. A method for focusing a laser light beam, comprising the steps of:

emitting a laser light beam along an optical emission path;

focusing with a focusing device the light beam in a focusing point (F) located at a focusing distance (D);

detecting the focusing distance (D); and adjusting the position of the focusing point (F) based on the detected focusing distance (D), wherein the step of detecting the focusing distance (D) comprises the step of detecting a wavefront radius of curvature of the emitted focused light beam optically in between the focusing device and the focusing point (F), the wavefront radius of curvature being representative of the focusing distance (D), the step of detecting the focusing distance (D) further comprising the steps of:

generating a reflected light beam that propagates along a reflected optical path inclined relative to the optical emission path, the reflected light beam comprising a pair of light beams partly overlapped and defining an interference region;

detecting the reflected beam for generating a signal representative of a parameter characteristic of the interference region; and processing the signal for generating a signal indicative of the wavefront radius of curvature.

24. The method according to claim 23, wherein the steps of detecting the focusing distance (D) and adjusting the position of the focusing point (F) based on the detected focusing distance (D) are repeated iteratively until a wanted focusing distance (D) is reached.

25. The method according to claim 23, wherein the step of detecting the focusing distance (D) comprises the step of calculating a value of the focusing distance (D).

26. The method according to claim 23, wherein the processing step comprises the step of determining the spatial frequency of a plurality of interference fringes defined by the interference region on an observation plane (P) located in the reflected optical path.

27. The method according to claim 26, wherein the step of determining the spatial frequency of the plurality of fringes comprises the steps of:

selecting at least one portion of the interference region for generating a signal representative of the light intensity of the at least one portion of the interference region; and calculating an integral of the light intensity of the at least one portion of interference region.

28. The method according to claim 27, wherein the at least one portion of the interference region is a rectangular portion, with a shorter side oriented along a direction (x) of succession of the fringes.

29. The method according to claim 28, wherein the at least one portion of the interference region has a dimension, along the direction (x) of succession of the fringes, such that, for a predetermined range of the frequency of the fringes, an integral function of the light intensity of the at least one portion of interference, region is monotonic.

30. A coded information reader comprising:

a focusing device for focusing a laser light beam, comprising:

an emission source of a laser light beam along an optical emission path;

first focusing means of the laser light beam in a focusing point (F) located at a focusing distance (D);

means for adjusting the position of the focusing point (F) relative to the device; and means for detecting the focusing distance (D) active in feedback on the adjustment means, wherein the detection means is optically in between the first focusing means and the focusing point (F) and detects a wavefront radius of curvature of the light beam leaving the first focusing means, the wavefront radius of curvature being representative of the focusing distance (D); and photodetector means for detecting light diffused by an optical code, wherein said detection means of the focusing device includes:

a glass sheet of predetermined thickness and refraction index, arranged in the optical emission path downstream of the first focusing means and adapted to generate a reflected light beam that propagates along a reflected optical path inclined relative to the optical emission path, the reflected light beam being defined by a pair of light beams partly overlapped and defining an interference region; and a light guide positioned in the reflected optical path for directing the reflected light beam to said photodetector means.

31. A device for focusing a laser light beam, comprising:

an emission source of a laser light beam along an optical emission path;

first focusing means of said laser light beam in a focusing point (F) located at a focusing distance (D);

means for adjusting the position of said focusing point (F) relative to said device; and means for detecting said focusing distance (D) active in feedback on said adjustment means, wherein said detection means is optically in between the first focusing means and the focusing point (F) and detects a wavefront radius of curvature of the light beam leaving the first focusing means, wherein the wavefront radius of curvature is representative of the said focusing distance, and wherein said detection means comprises:

a glass sheet of predetermined thickness and refraction index, arranged in said optical emission path downstream of said first focusing means and adapted to generate a reflected light beam that propagates along a reflected optical path inclined relative to said optical emission path, said reflected light beam being defined by a pair of light beams partly overlapped and defining an interference region comprising a plurality of interference fringes;

photodetector means arranged in said reflected optical path and adapted to generate a signal representative of the spatial frequency of the interference fringes defined by at least one portion of said interference region on an observation plane (P) located in said reflected optical path, wherein said at least one portion of said interference region has a dimension, along a direction (x) of succession of the fringes, such that, for a predetermined range of the frequency of the fringes, an integral function of the light intensity of said reflected light beam at said at least one portion of interference region is monotonic; and means for processing said signal so as to generate a signal indicative of said wavefront radius of curvature.

32. A method for focusing a laser light beam, comprising the steps of:

emitting a laser light beam along an optical emission path;

focusing with a focusing device said light beam in a focusing point (F) located at a focusing distance (D);

detecting said focusing distance (D) by first focusing means; and adjusting the position of said focusing point (F) based on the detected focusing distance (D), wherein the step of detecting the focusing distance (D) comprises the step of detecting a wavefront radius of curvature of the emitted focused light beam optically in between the focusing device and the focusing point (F), the wavefront radius of curvature being representative of said focusing distance (D), and wherein the step of detecting the focusing distance (D) comprises the steps of:

generating from the emitted light beam a reflected light beam that propagates along a reflected optical path inclined relative to said optical emission path, said reflected light beam comprising a pair of light beams partly overlapped and defining an interference region comprising a plurality of interference fringes;

detecting said reflected beam for generating a signal representative of the spatial frequency of the interference fringes defined by at least one portion of said interference region on an observation plane (P) located in said reflected optical path, wherein said at least one portion of said interference region has a dimension, along a direction (x) of succession of the fringes, such that, for a predetermined range of the frequency of the fringes, an integral function of the light intensity of said reflected light beam at said at least one portion of interference region is monotonic; and processing said signal for generating a signal indicative of said wavefront radius of curvature.

* * * * *

UNITED STATES PATENT AND TRADEMARK OFFICE
CERTIFICATE OF CORRECTION

| | | |
|---|---|---|
| PATENT NO. | : 7,593,114 B2 | Page 1 of 1 |
| APPLICATION NO. | : 11/379871 | |
| DATED | : September 22, 2009 | |
| INVENTOR(S) | : Gabriele Corrain | |

It is certified that error appears in the above-identified patent and that said Letters Patent is hereby corrected as shown below:

Column 26, line 61, claim 31 delete "the"

Signed and Sealed this

Twenty-fourth Day of November, 2009

David J. Kappos
*Director of the United States Patent and Trademark Office*